(12) United States Patent
Ikeda et al.

(10) Patent No.: US 7,746,491 B2
(45) Date of Patent: Jun. 29, 2010

(54) INFORMATION PROCESSING METHOD AND APPARATUS

(75) Inventors: Hiromi Ikeda, Kanagawa (JP); Tsuyoshi Yagisawa, Kanagawa (JP); Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1149 days.

(21) Appl. No.: 10/899,142

(22) Filed: Jul. 27, 2004

(65) Prior Publication Data

US 2005/0027483 A1   Feb. 3, 2005

(30) Foreign Application Priority Data

Jul. 29, 2003   (JP) ............................. 2003-203284

(51) Int. Cl.
*H04N 1/46* (2006.01)
*H04N 1/40* (2006.01)
*G06K 15/00* (2006.01)
*G06F 3/12* (2006.01)

(52) U.S. Cl. ...................... 358/1.15; 702/183; 358/501; 358/1.18; 358/3.28; 358/1.5

(58) Field of Classification Search ................ 358/1.15, 358/1.18, 1.9, 2.1, 450, 452, 453, 462, 538; 455/41; 348/629, 211.8; 705/2; 709/206; 382/309; 725/39; 345/629
See application file for complete search history.

(56) References Cited

U.S. PATENT DOCUMENTS

| | | | | |
|---|---|---|---|---|
| 5,581,667 A | * | 12/1996 | Bloomberg | 358/1.9 |
| 5,606,429 A | * | 2/1997 | Sheldon et al. | 358/450 |
| 5,680,150 A | * | 10/1997 | Shimizu et al. | 358/538 |
| 5,815,645 A | * | 9/1998 | Fredlund et al. | 358/1.18 |
| 5,880,740 A | * | 3/1999 | Halliday et al. | 345/629 |
| 5,966,462 A | * | 10/1999 | Linder et al. | 358/462 |
| 6,128,108 A | * | 10/2000 | Teo | 358/540 |
| 6,266,153 B1 | * | 7/2001 | Davidson et al. | 358/1.9 |

(Continued)

FOREIGN PATENT DOCUMENTS

JP   10-133982   5/1998

(Continued)

OTHER PUBLICATIONS

U.S. Appl. No. 10/885,060, filed Jul. 7, 2004.

*Primary Examiner*—King Y Poon
*Assistant Examiner*—Akwasi M Sarpong
(74) *Attorney, Agent, or Firm*—Fitzpatrick, Cella, Harper & Scinto

(57) ABSTRACT

There are provided an information processing method and apparatus, which can composite an image at a link destination into document data upon printing document data that describes address information as a link to an image file, can obviate the need for additional access by the user, and can improve user's convenience. This information processing apparatus prints document data that describes address information of an image on a server which can be accessed via the Internet. An operation unit (107) issues a print instruction of an image, and makes its setups. Address information is detected from document data, and that image is accessed via the Internet. It is checked if the accessed image can be embedded in the document data. If the accessed image can be embedded, that image is downloaded. The downloaded image is embedded at a predetermined position in the document upon printing the document data.

13 Claims, 25 Drawing Sheets

U.S. PATENT DOCUMENTS

| | | | |
|---|---|---|---|
| 6,546,417 B1* | 4/2003 | Baker | 709/206 |
| 6,704,467 B2* | 3/2004 | Uchida | 358/453 |
| 6,708,309 B1* | 3/2004 | Blumberg | 715/209 |
| 6,822,756 B1* | 11/2004 | Cok et al. | 358/1.9 |
| 6,898,316 B2* | 5/2005 | Zhou | 358/452 |
| 7,050,195 B1* | 5/2006 | Jones | 358/1.9 |
| 7,092,116 B2* | 8/2006 | Calaway | 358/1.18 |
| 7,150,029 B1* | 12/2006 | Ebling et al. | 725/39 |
| 7,167,269 B2* | 1/2007 | Wu et al. | 358/1.18 |
| 7,203,364 B2* | 4/2007 | Yamazaki | 382/177 |
| 7,266,590 B2* | 9/2007 | Nakaoka et al. | 358/1.15 |
| 2002/0016718 A1* | 2/2002 | Rothschild et al. | 705/2 |
| 2002/0122201 A1* | 9/2002 | Haraguchi et al. | 358/1.15 |
| 2002/0168090 A1* | 11/2002 | Bruce et al. | 382/101 |
| 2003/0017805 A1* | 1/2003 | Yeung et al. | 455/41 |
| 2003/0140104 A1* | 7/2003 | Watanabe et al. | 709/206 |
| 2003/0158898 A1 | 8/2003 | Hirota et al. | 709/204 |
| 2003/0174907 A1* | 9/2003 | Kanemoto et al. | 382/309 |
| 2003/0179409 A1* | 9/2003 | Nishida | 358/2.1 |
| 2004/0001148 A1* | 1/2004 | Takemoto | 348/211.8 |
| 2004/0066530 A1* | 4/2004 | Wu et al. | 358/1.15 |

FOREIGN PATENT DOCUMENTS

| | | |
|---|---|---|
| JP | 2000-163243 | 6/2000 |
| JP | 2001-216210 | 8/2001 |

* cited by examiner

FIG. 2

| SETUP ITEM | SETUP | DEFAULT |
|---|---|---|
| IMAGE OUTPUT | ON / OFF | ON |
| IMAGE POSITION | LINK / SENTENCE END / PREDETERMINED | STILL IMAGE : LINK, MOVING IMAGE : PREDETERMINED |
| ADD CAPTION | ON / OFF | OFF |
| FRAME OUTPUT | ON / OFF | ON |
| MAXIMUM OUTPUT IMAGES | 1 TO 10 | 3 |
| QUOTE PART IMAGE OUTPUT | ON / OFF | OFF |
| MOVING IMAGE OUTPUT | TIME / SCENE | TIME |

FIG. 3

|  | VARIABLE | DEFAULT VALUE |
|---|---|---|
| STILL IMAGE POSITION | xs, ys | xs=100, ys=1000 |
| STILL IMAGE PREDETERMINED SIZE | hs, ws | hs=180, ws=297 |
| MOVING IMAGE PREDETERMINED POSITION | xm, ym | xm=500, ym=100 |
| MOVING IMAGE PREDETERMINED SIZE | hm, wm | hm=180, wm=297 |
| CAPTION | cap | FIGURE |
| CAPTION NUMBER | num | 1 |
| FRAME POSITION | xf, yf | xf=10, yf=10 |
| FRAME SIZE | hf, wf | hf=2800, wf=2000 |

INFORMATION PROCESSING METHOD AND APPARATUS

FIELD OF THE INVENTION

The present invention relates to an information processing technique for printing document data that describes address information as a link to an image disclosed on the Internet or the like.

BACKGROUND OF THE INVENTION

Along with the development and prevalence of the Internet, documents that describe address information as links to uploaded images and the like on the Internet are increasing. With the conventional technique, when document data that describes address information of a link destination is printed, that address information is normally printed as characters. Therefore, in order to print an image at the link destination, the user must independently access that image at the link destination by, e.g., clicking the address information and print it, resulting in troublesome operations.

On the other hand, a method that allows reception of home page data corresponding to a URL included in mail data together with the mail data upon reception of an e-mail message is disclosed (for example, patent reference 1 (Japanese Patent Laid-Open No. 2001-216210)). With this method, since home page data is received together with mail data, the user need not re-establish connection to a provider upon accessing the URL described in that mail data, thus slightly reducing user's manual operations.

However, even when the method described in patent reference 1 is used, the user must independently access and print an image file received in addition to document data upon printing an image, thus requiring user's labor and time. In addition, a document and image are separately output as print data, resulting in inconvenience.

SUMMARY OF THE INVENTION

The present invention has been proposed to solve the conventional problems, and has as its objects to provide an information processing method and apparatus, which can composite an image at a link destination with document data and can print them together upon printing document data that describes address information as a link to an image file, can obviate the need for additional access by the user, and can obtain output data that can improve user's convenience.

In order to solve the problems, according to the present invention, there is provided an information processing method for printing document data that describes address information associated with predetermined information which can be accessed via a network, comprising:

an instruction step of issuing a print instruction of the information;

a detection step of detecting, when the print instruction of the information is issued in the instruction step, the address information;

a composition step of downloading the information via the network using the detected address information and embedding the downloaded information at a predetermined position in the document data; and a print step of printing the document data embedded with the information.

Also, in order to solve the problems, according to the present invention, there is provided an information processing apparatus for printing document data that describes address information associated with predetermined information which can be accessed via a network, comprising:

instruction means for issuing a print instruction of the information;

detection means for, when the instruction means issues the print instruction of the information, detecting the address information;

composition means for downloading the information via the network using the detected address information and embedding the downloaded information at a predetermined position in the document data; and print means for printing the document data embedded with the information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 2 is a table showing an example of various setup items and their default values used in the information processing apparatus according to the first embodiment;

FIG. 3 is a table showing an example of variables associated with various setups and their default values used in the information processing apparatus according to the first embodiment;

DETAILED DESCRIPTION OF THE PREFERRED EMBODIMENTS

Preferred embodiments of an information processing apparatus that implements an information processing method according to the present invention will be described hereinafter with reference to the accompanying drawings.

First Embodiment

Figure 1:
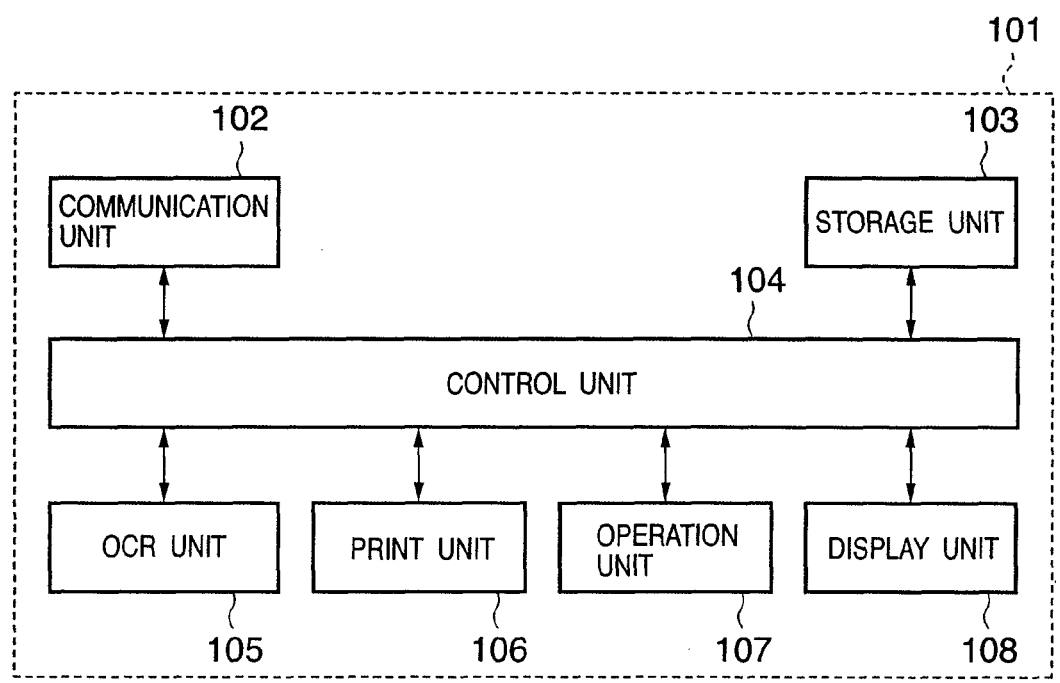
FIG. 1 is a block diagram showing the arrangement of an information processing apparatus according to the first embodiment of the present invention.

FIG. 1 is a block diagram showing the arrangement of an information processing apparatus according to the first embodiment of the present invention. An information processing apparatus 101 according to this embodiment comprises a communication unit 102, storage unit 103, control unit 104, OCR unit 105, print unit 106, operation unit 107, and display unit 108, as shown in FIG. 1.

The communication unit 102 is connected to a network such as the Internet or the like, and makes data communications with Web sites and FTP sites on the Internet, an external apparatus such as a server computer or the like on a network such as a LAN or the like, and so forth. The storage unit 103 comprises a portable storage medium such as a magnetic disk, optical disk, or the like, or a fixed storage medium such as a hard disk device or the like, and stores an application program, image processing program, tag parsing program, and the like.

The control unit 104 comprises a work memory, microcomputer, and the like, and reads out and executes programs stored in the storage unit 103. The OCR unit 105 optically reads handwritten characters or characters of a predetermined font printed on a document, specifies such characters by collating them with pre-stored patterns, and inputs character data. Note that the OCR unit 105 may comprise a scanner, and OCR software that identifies characters from a scanned image, and converts them into text data.

The print unit 106 prints text data, image data, and the like on print media such as a paper sheet, OHP sheet, and the like. Note that the print unit 106 may be a device which is independent from the information processing apparatus as a printer. In this case, the information processing apparatus comprises an interface with such printer. The operation unit 107 comprises buttons, a keyboard, mouse, touch panel, pen, tablet, and the like, and is used to operate this information processing apparatus. The display unit 108 comprises, e.g., a display device such as a liquid crystal display or the like, and displays images, text, and the like on its screen. Note that the display unit 108 may comprise a touch panel which has some functions of the operation unit 107 together.

FIG. 2 is a table showing an example of various setup items and their default values, which are used in the information processing apparatus according to the first embodiment. The storage unit 103 stores various setup items, their settable values, and default values, as shown in FIG. 2. The setup items include "image output [ON/OFF]", "image position [link/sentence end/predetermined]", "add caption [ON/OFF]", "frame output [ON/OFF]", "maximum output images [1-10]", "quote part image output [ON/OFF]", and "moving image output [time/scene]".

Note that "image output [ON/OFF]" is used to set whether or not an image is printed together with document data upon printing document data that describes address information as a link to an image file. "Image position [link/sentence end/predetermined]" is information used to set a position in a document where an image is to be laid out (embedded), and this position can be selected from a position where address information is described, a sentence end, and a predetermined position (i.e., a position set on the application side). Note that the predetermined position may be set by the user himself or herself via the operation unit 107 by inputting a coordinate position or designating an area.

"Add caption [ON/OFF]" is used to set whether or not a caption is to be added to an image. "Frame output [ON/OFF]" is used to set whether or not an image is to be output if that image is a frame such as an ornamental frame or the like. Whether or not an image is a frame is determined based on, e.g., the type of tag in document data. "Maximum output images [1-10]" is used to set the maximum number of images to be output. In this embodiment, for example, a maximum of 10 images can be laid out in document data.

"Quote part image output [ON/OFF]" is used to set whether or not an image is to be printed when a document quoted in, e.g., a reply mail message or the like includes address information as a link to an image file. "Moving image output [time/scene]" is used to make a setup upon selecting an image from a moving image within the range of the aforementioned maximum number of output images when an image file as a link destination is a moving image. For example, whether one or a plurality of image frames are selected from a moving image using time information or using information associated with a scene (image) change is set upon selecting the image. Note that the method of selecting several image frames from a moving image on the basis of time information or scene change information uses an existing technique.

FIG. 3 is a table showing an example of variables associated with various setups and their default values, which are used in the information processing apparatus according to the first embodiment. In this embodiment, as shown in FIG. 3, as variables associated with setups, "still image predetermined position" (image upper left position: x-coordinate, y-coordinate), "still image predetermined size" (image height, width), "moving image predetermined position (image upper left position: x-coordinate, y-coordinate), "moving image predetermined size" (image height, width), "caption" (label name of a caption), "caption number" (caption number), "frame position" (frame image upper left position: x-coordinate, y-coordinate), and "frame size" (frame height, width) are used. Note that these values can be set on the application side or set by the user himself or herself by inputting the coordinates or designating an area using the operation unit 107.

Figure 4:
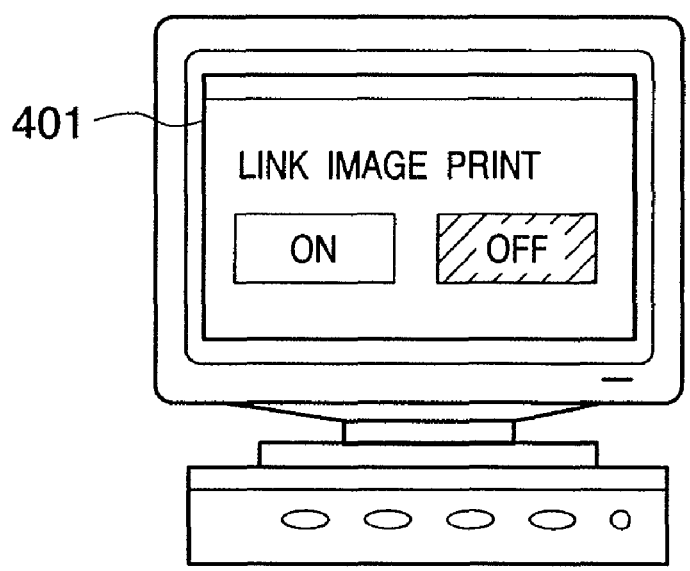
FIG. 4 shows a display example of a print setup window in the information processing apparatus according to the first embodiment.

The information processing method in the information processing apparatus according to the first embodiment will be explained below taking as an example a case wherein mail data is printed. FIG. 4 shows a display example of a print setup window on the information processing apparatus according to the first embodiment. As shown in FIG. 4, in this embodiment, whether or not a linked image is to be printed can be displayed and set via the display unit 108 which is realized by a touch panel.

Figure 5:
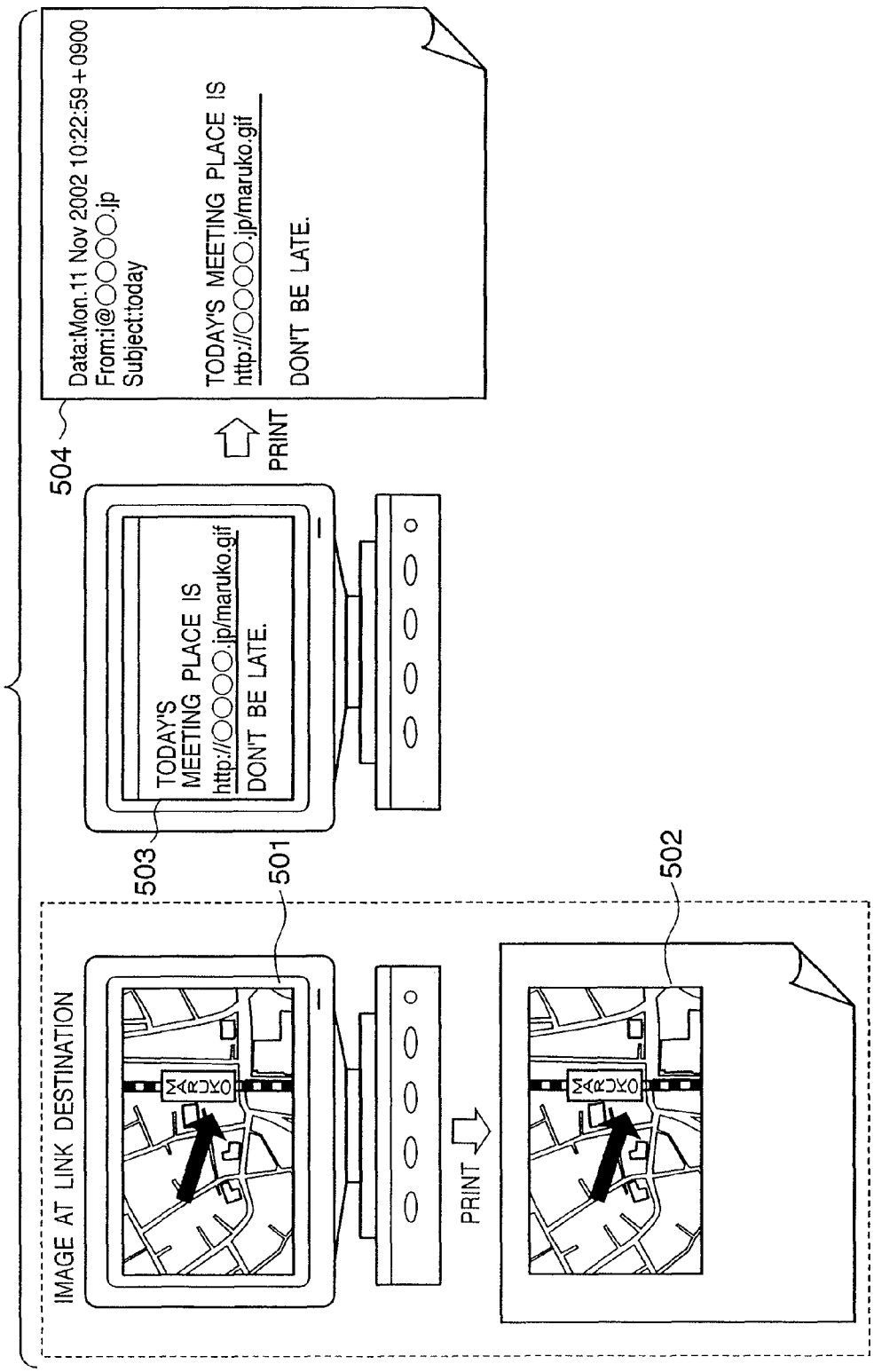
FIG. 5 is a view for explaining an overview of a print process by the information processing apparatus according to the first embodiment.

FIG. 5 shows an overview of a print process by the information processing apparatus according to the first embodiment. Referring to FIG. 5, a document 503 is that of mail data that describes address information as a link to an image file. When the document 503 is printed while "link image print=OFF" is set on the display window in FIG. 4, only text is printed out on a print medium such as a paper sheet or the like (504). In this case, when the user wants to print an image 501 at a link destination, he or she independently accesses the image file 501 at the link destination by clicking the address information, and prints that image. In this way, only an image is printed out on a print medium such as a paper sheet or the like (502). That is, the information processing apparatus according to this embodiment comprises instruction means for making a print instruction.

Figure 6:
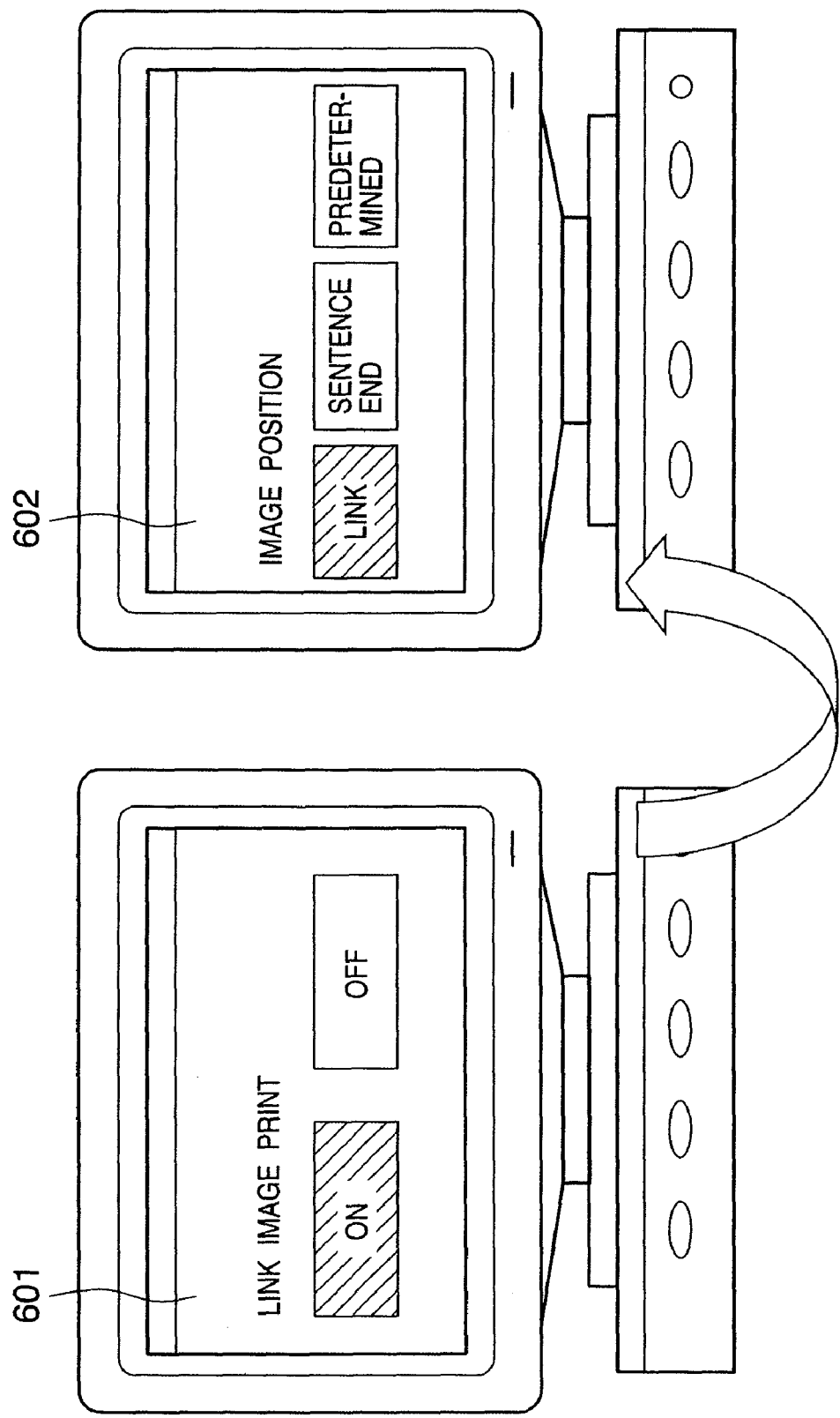
FIG. 6 is a view for explaining an example of a print setup according to the first embodiment.
Figure 7:
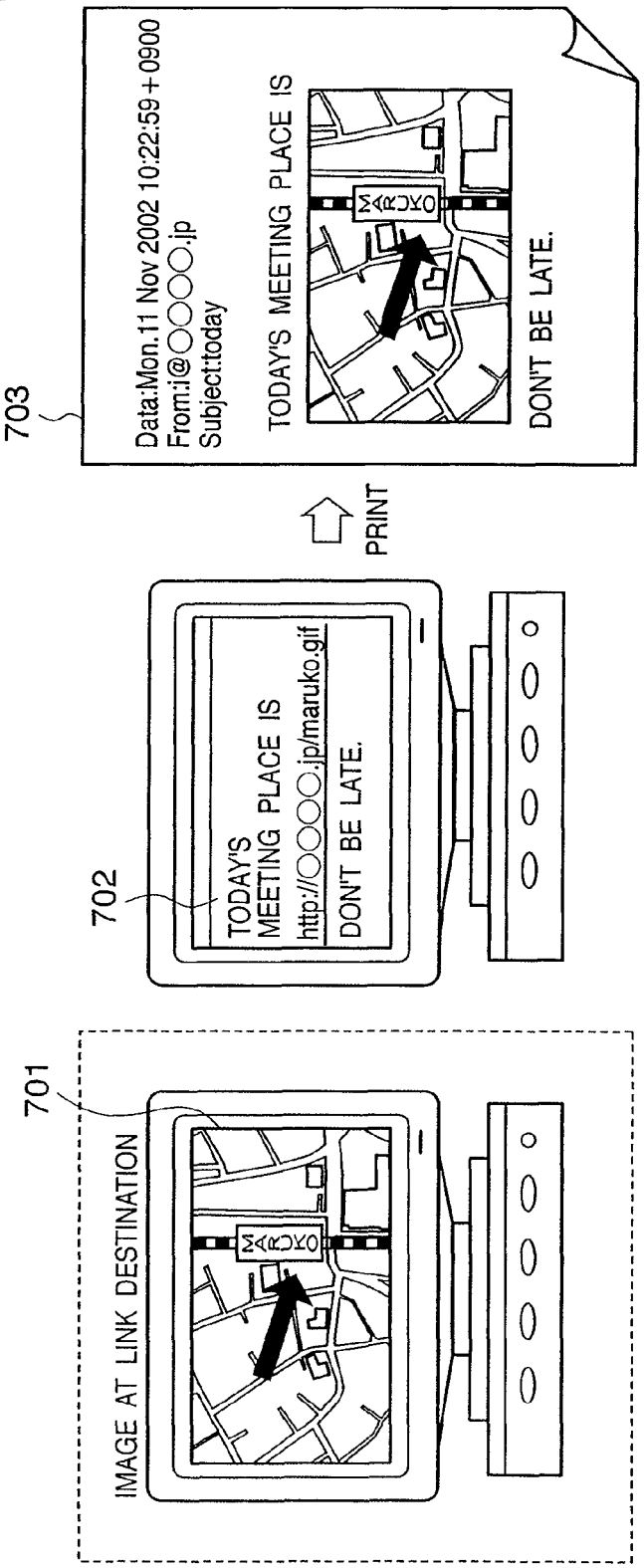
FIG. 7 is a view for explaining an overview of a print process by the information processing apparatus when the setup shown in FIG. 6 in the first embodiment is made.

FIG. 6 is a view for explaining an example of a print setup according to the first embodiment. For example, a case will be explained below wherein "link image print=ON" (601 in FIG. 6) and "image position=link (a link description position)" (602) are set. FIG. 7 is a view for explaining an overview of a print process by the information processing apparatus when the setup shown in FIG. 6 in the first embodiment is made. That is, as shown in FIG. 7, when the setup in FIG. 6 is made, an image 701 at a link destination is composited with text at the position where the address information is described upon printing a document 702. In this manner, a document composited with an image can be printed out (703).

Figure 8:
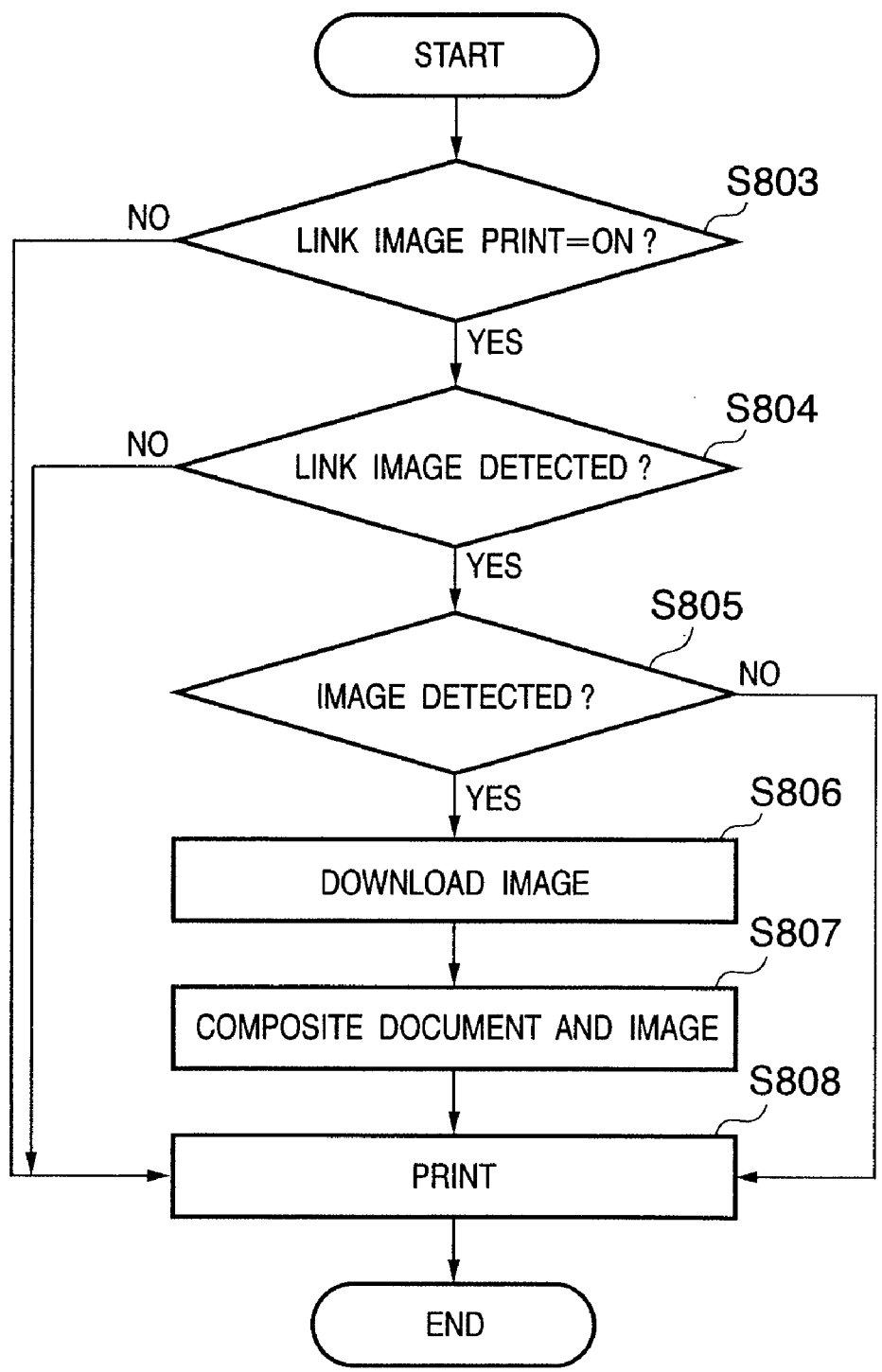
FIG. 8 is a flowchart for explaining an example of a print operation sequence by the information processing apparatus according to the first embodiment.

FIG. 8 is a flowchart for explaining an example of a print operation sequence by the information processing apparatus according to the first embodiment. Upon reception of a document print instruction, it is checked based on the setup shown in FIG. 4 if a print setup of an image at a link destination is ON for that document (step S803). More specifically, the information of the setup items shown in FIG. 2 is read, and the checking process in step S803 is attained based on that information. As a result, if the print setup of an image at a link destination is OFF (NO in step S803), a print process of the document alone is executed (step S808).

On the other hand, if the print setup of an image at a link destination is ON (YES in step S803), it is checked if the document data includes address information as a link to an image file (step S804). That is, the information processing apparatus according to this embodiment comprises detection means for detecting address information in document data. Whether or not the document data includes the address information as a link can be determined by checking, e.g., if document data includes a character string "http://", "file://", or the like. As a result, if no address information is included (NO in step S804), a print process of the document alone is executed (step S808).

On the other hand, if the address information is included (YES in step S804), access is made to the link destination to check if an image is present (step S805). That is, the information processing apparatus according to this embodiment comprises access means for accessing an image via a network using detected address information. An image file can be determined when the extension ("jpg" in case of JPEG) or the MIME (Multipurpose Internet Mail Extensions) type (e.g., "image/jpg" in case of JPEG) of a file at the link destination indicates an image. More specifically, the information processing apparatus according to this embodiment comprises determination means for determining if a file at a link destination is an image (i.e., information to be embedded in document data). As a result, if no image is found at the link destination, or if a description error has occurred or a dead link is found (NO in step S805), a print process of the document alone is executed (step S808).

On the other hand, if an image file is found as a result of access to the link destination (YES in step S805), that image is downloaded (step S806). That is, the information processing apparatus according to this embodiment comprises download means for downloading an image. If document data includes a plurality of pieces of address information as links to a plurality of image files, and image files are actually present at some of these pieces of address information, only existing image files are downloaded, and the flow advances to step S807. Each downloaded image is composited with a document (step S807), and a print process on a print medium such as a paper sheet or the like is executed (step S808). That is, the information processing apparatus according to this embodiment comprises composition means for compositing an image and document, and print means for printing these image and document. Note that the composition position of the image is that set in FIGS. 2 and 3, and a composition process of a document and image uses an existing image processing technique.

Figure 9:
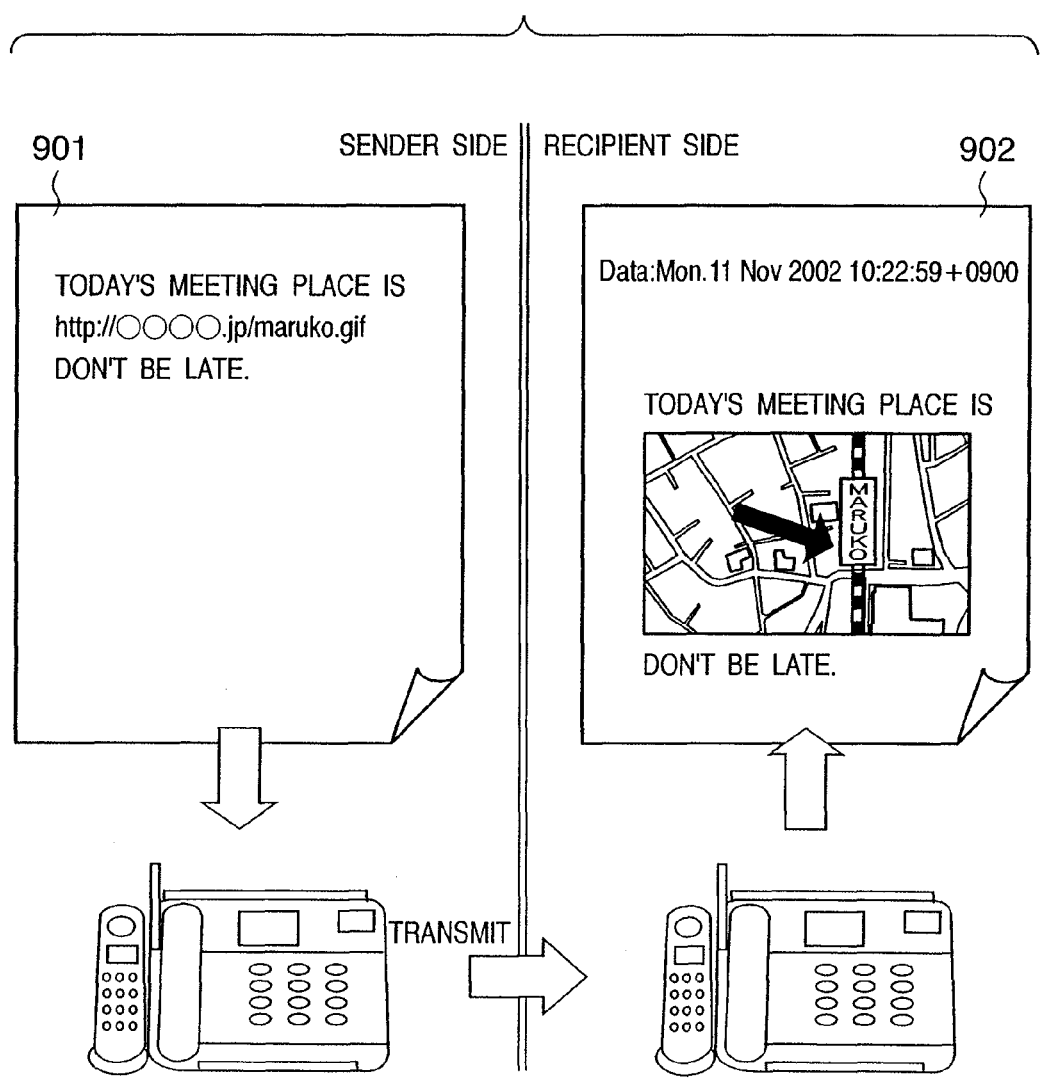
FIG. 9 is a view showing an overview upon optically reading a document and executing an information process according to the first embodiment.

This embodiment has exemplified mail data. When a FAX document or the like is used, the aforementioned process may be applied after handwritten or printed characters are optically read using an existing OCR technique. FIG. 9 shows an overview of an information process according to this embodiment which is executed after a document is optically read. In this case as well, the process after a document is read and is converted into document data can be executed in the same sequence as that in the above embodiment.

As described above, according to the first embodiment, upon printing document data which includes address information as a link to an image file, the image file can be composited into a document, and can be printed together with the document, thus improving user's convenience. Also, since the user himself or herself can designate the image position, he or she can print using a desired layout.

Second Embodiment

An information processing method in an information processing apparatus according to the second embodiment of the present invention will be described below. Note that the arrangement of the information processing apparatus according to this embodiment is the same as that of the information processing apparatus according to the first embodiment shown in FIG. 1.

The first embodiment has exemplified a document print process when setups "image output [ON/OFF]" and "image position [link/sentence end/predetermined]" are made. This embodiment will explain a processing sequence executed when a setup "add caption [ON/OFF]" is also made to add a caption to an image upon outputting a linked image.

Figure 10:
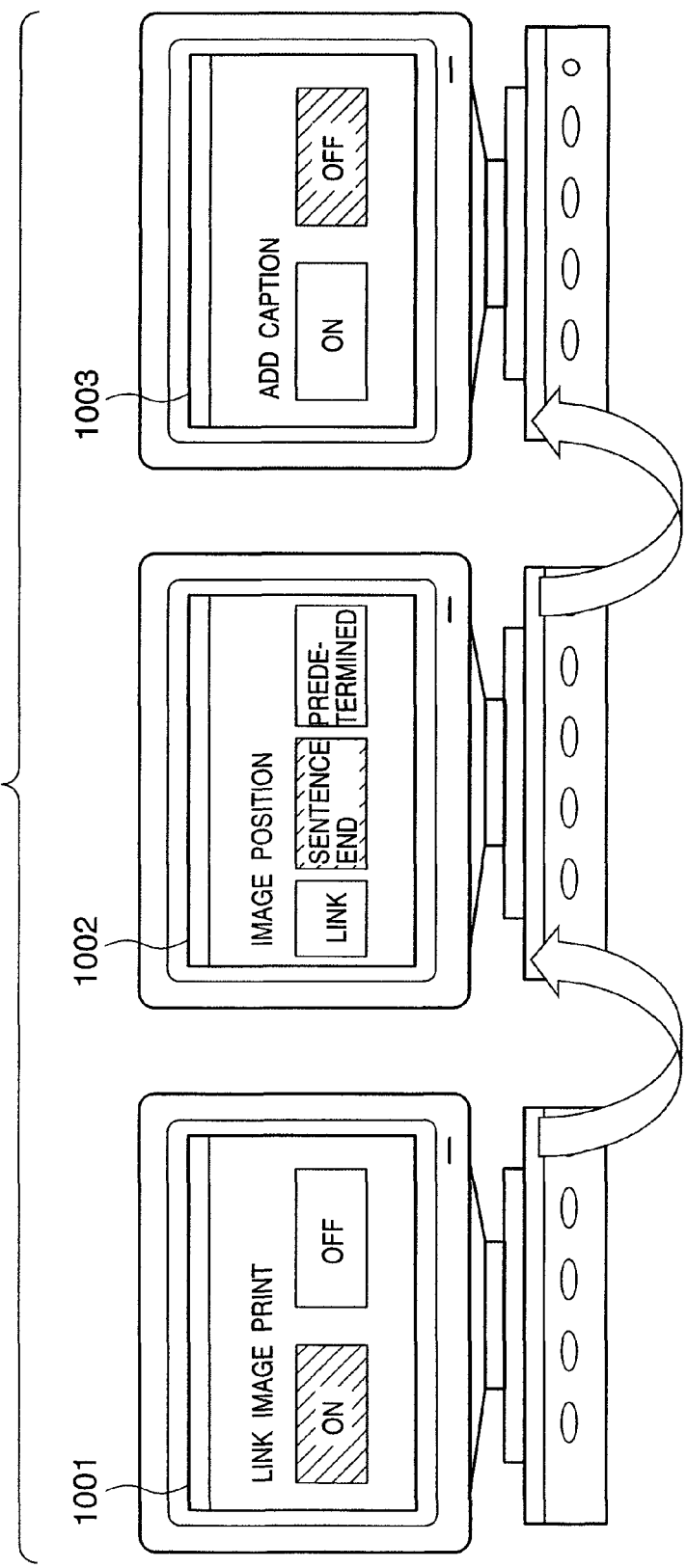
FIG. 10 is a view for explaining an example of an operation when no caption is added in an information processing apparatus according to the second embodiment.
Figure 11:
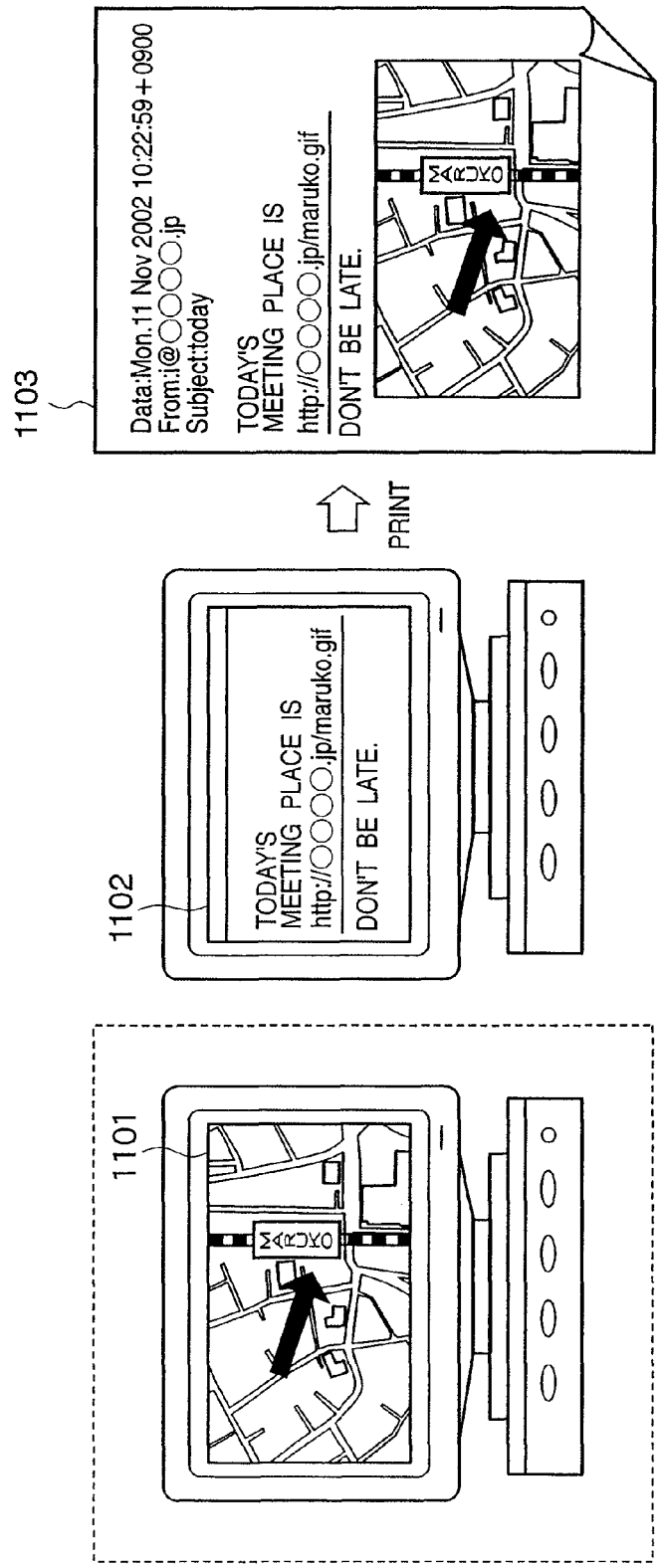
FIG. 11 is a view for explaining a print operation of the information processing apparatus when the setups shown in FIG. 10 are made.

FIG. 10 is a view for explaining an example of an operation when no caption is added by the information processing apparatus according to the second embodiment. A case will be described below wherein a setup "link image print=ON" (1001 in FIG. 10) is made first, a setup "image position=sentence end" (1002) is made, and a setup "add caption=OFF" (1003) is made. FIG. 11 is a view for explaining a print operation of the information processing apparatus when the setups shown in FIG. 10 are made. When the setups shown in FIG. 10 are made, an image 1101 at a link destination is composited at the sentence end of document data upon printing a document 1101, as shown in FIG. 11. In this manner, a document composited with an image can be printed out while leaving address information (1103).

Figure 12:
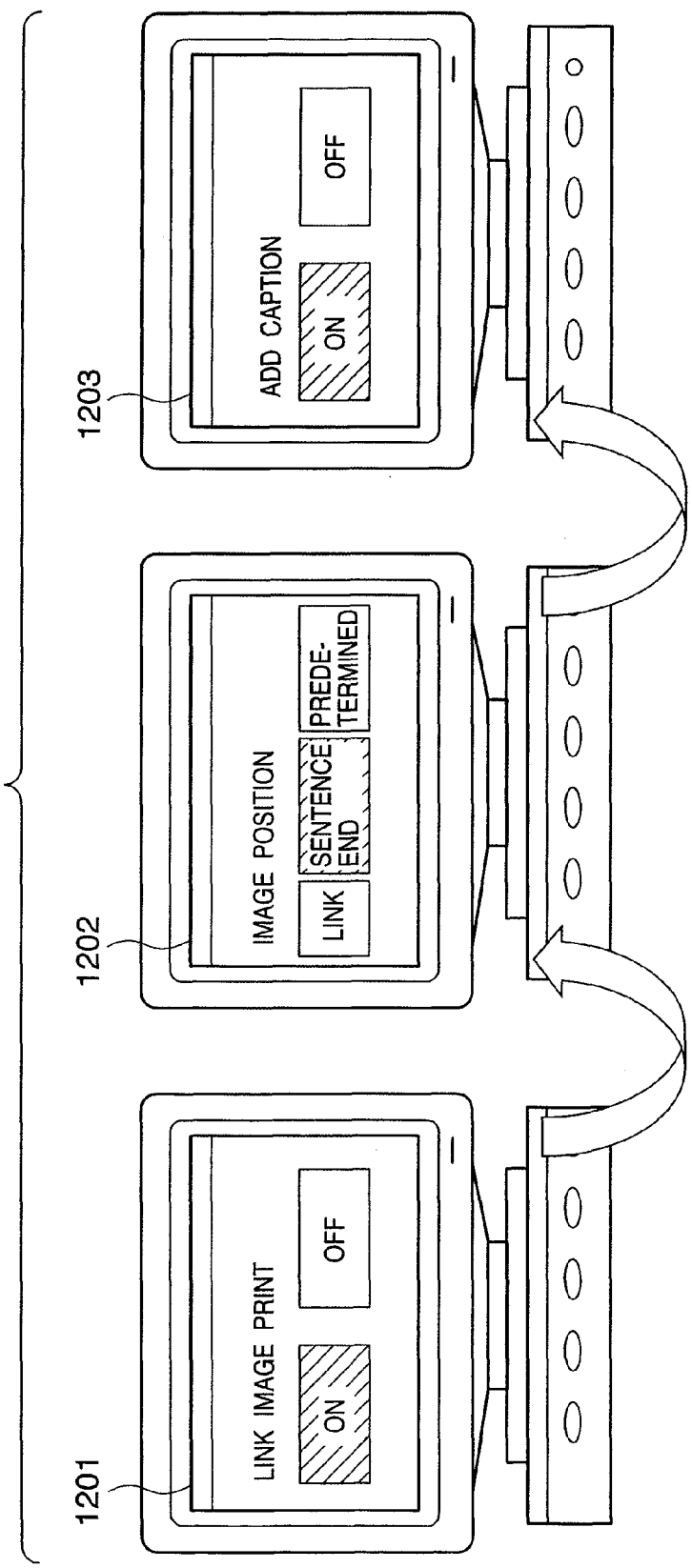
FIG. 12 is a view for explaining an example of an operation when a caption is added in the information processing apparatus according to the second embodiment.
Figure 13:
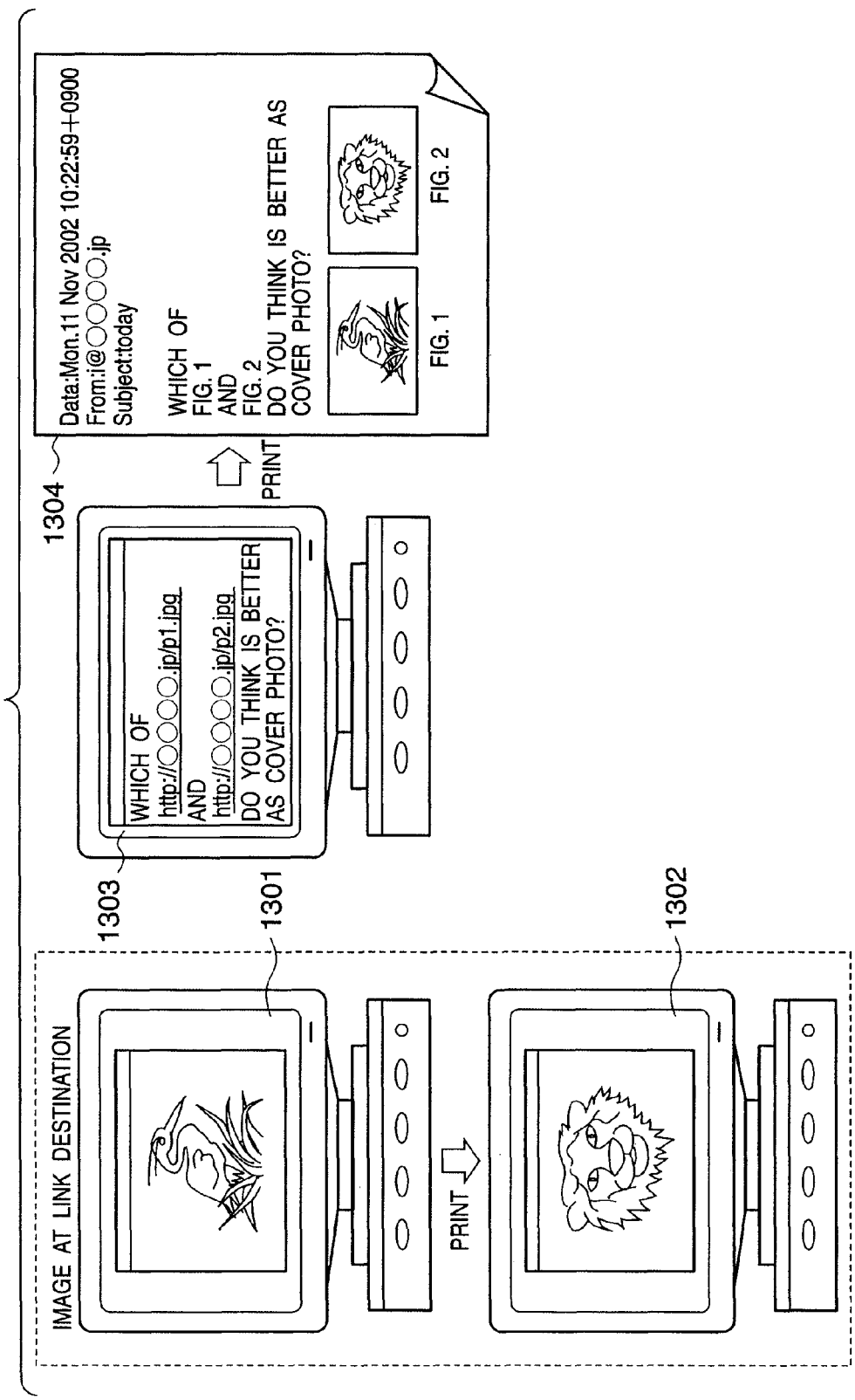
FIG. 13 is a view for explaining a print operation of the information processing apparatus when the setups shown in FIG. 12 are made.

FIG. 12 is a view for explaining an operation when a caption is added by the information processing apparatus according to the second embodiment. A case will be explained below wherein a setup "link image print=ON" (1201 in FIG. 12) is made first, a setup "image position=sentence end" (1202) is set, and a setup "add caption=ON" (1203) is made. FIG. 13 is a view for explaining a print operation of the information processing apparatus when the setups shown in FIG. 12 are made. Images 1301 and 1302 at link destinations are composited to the sentence end of a document (1304) upon printing a document 1303. In this case, captions (for example, "FIG. 1" and "FIG. 2" in FIG. 13) are added to the images 1301 and 1302, and the descriptions of link information in the document are replaced by the captions of the images.

Figure 14:
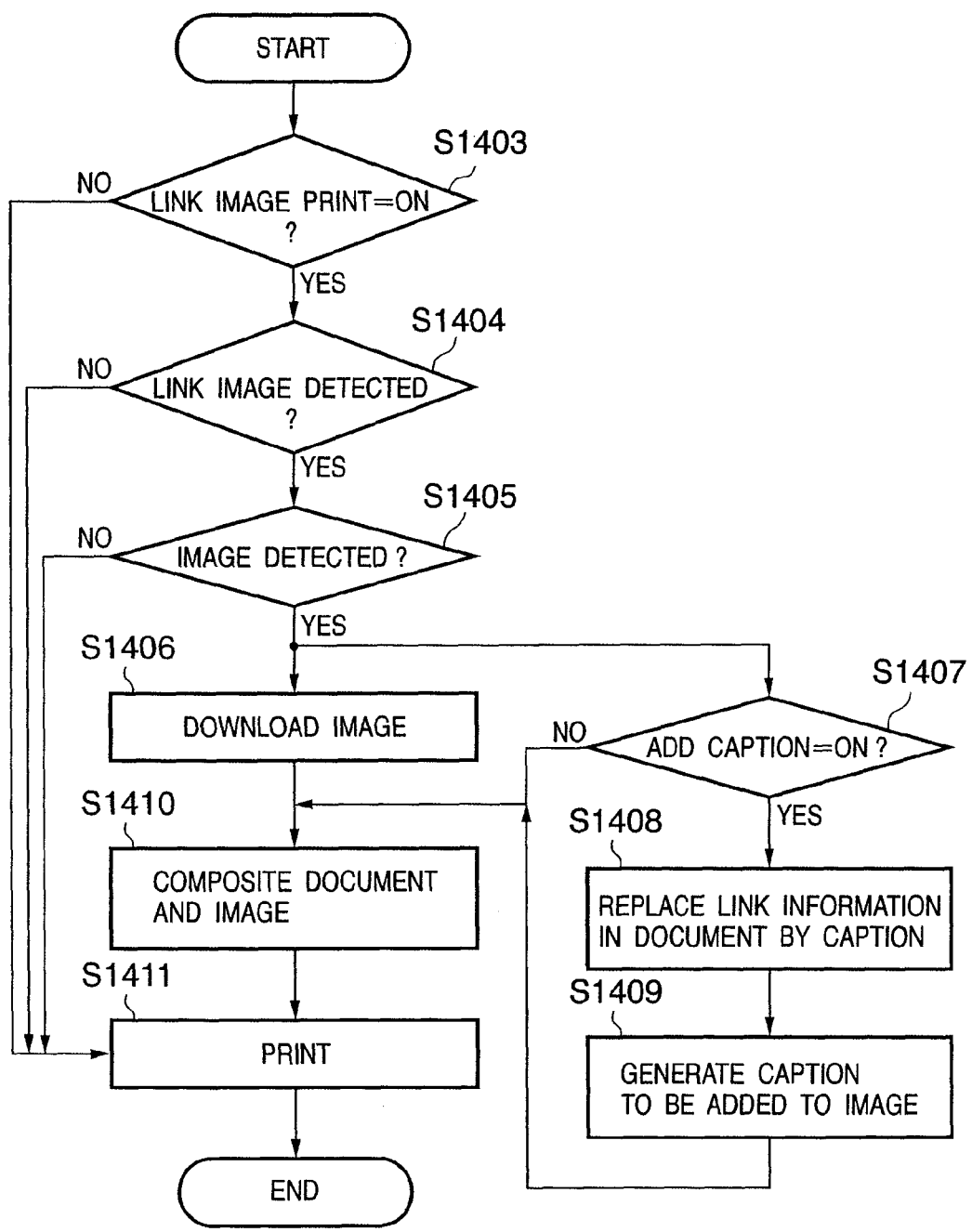
FIG. 14 is a flowchart for explaining an example of a print operation sequence by the information processing apparatus according to the second embodiment.

FIG. 14 is a flowchart for explaining an example of a print operation sequence by the information processing apparatus according to the second embodiment. Upon reception of a document print instruction, it is checked based on the setup shown in FIG. 10 or 12 if a print setup of an image at a link destination is ON for that document (step S1403). Whether or not the print setup of the image is ON is determined using the setup shown in FIG. 2 in the same manner as the first embodiment. As a result, if the print setup of an image at a link destination is OFF (NO in step S1403), a print process of the document alone is executed (step S1411). On the other hand, if the print setup of an image at a link destination is ON (YES in step S1403), it is checked if the document data includes address information as a link to an image file (step S1404). Whether or not the document includes address information as a link to an image file is determined in the same manner as in the first embodiment. As a result, if no address information is included (NO in step S1404), a print process of the document alone is executed (step S1411).

On the other hand, if the address information is included (YES in step S1404), it is checked if an image is present at the link destination (step S1405). This checking process is also made in the same manner as in the first embodiment. As a result, if no image is found at the link destination, or if a description error has occurred or a dead link is found (NO in step S1405), a print process of the document alone is executed (step S1411). If document data includes a plurality of pieces of address information as links to a plurality of image files, and image files are actually present at some of these pieces of address information, only existing image files are to be downloaded. That is, if it is determined that the address information is included (YES in step S1405), the corresponding image is downloaded (step S1406). It is checked based on the setup in FIG. 2 if a caption is to be added (step S1407).

As a result, if the setup "add caption" is ON (YES in step S1407), the address information (character string) in the document is replaced by a caption (character string) (step S1408), and a caption (character string) to be added to the image is generated (step S1409). For example, if there are a plurality of pieces of address information as links to a plurality of images, and some pieces of information (character strings) are the same, these pieces of information are replaced by an identical caption (character string) to display a common image (i.e., one image). The image downloaded in step S1406 is composited with a document (step S1410), and a print process is executed (step S1411). Note that the composition position of the image is that set in FIGS. 2 and 3, and a composition process of a document and image uses an existing image processing technique.

As described above, according to the second embodiment, an image file can be printed together with a document upon printing a document that describes address information as a link to an image file. In this case, since "add caption=ON/OFF" can be selected, an organized printout can be obtained, thus further improving user's convenience.

Third Embodiment

An information processing method in an information processing apparatus according to the third embodiment of the present invention will be described below. In the description of the first and second embodiments, when a document includes address information as a link to an image file, a setup about whether or not that image is to be printed is made upon printing the document. This embodiment will explain a case wherein when the document further includes a quote part, the aforementioned setup is made for images of the body text and quote part.

Figure 15:
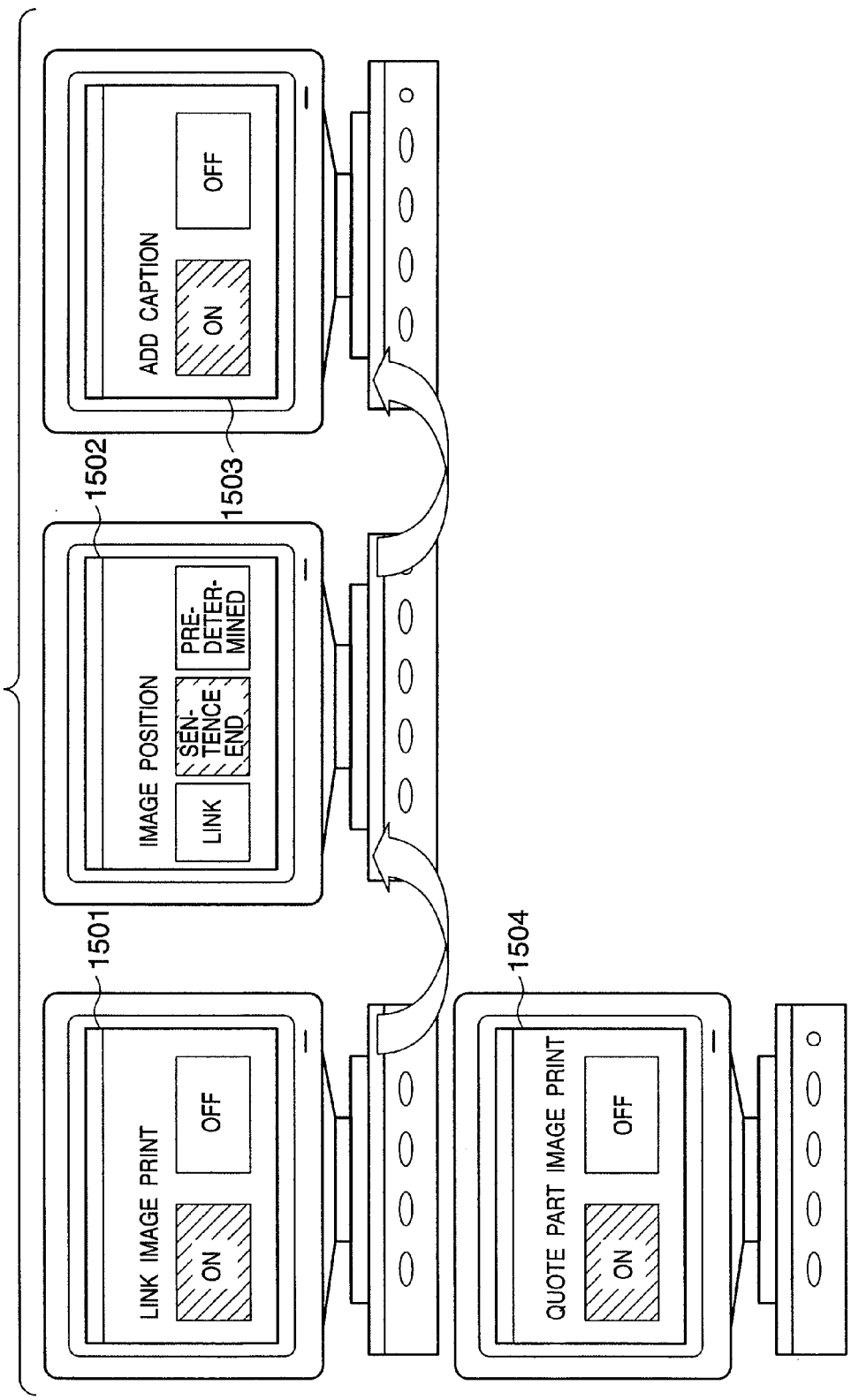
FIG. 15 is a view for explaining an example of an operation when a quote part image is to be printed by an information processing apparatus according to the third embodiment.

FIG. 15 is a view for explaining an example of an operation when a quote part image is printed by the information processing apparatus according to the third embodiment. A setup "link image print=ON" (1501 in FIG. 15) is made, a setup "image position=sentence end" (1502) is made, and a setup "add caption=ON" (1503) is made. In this embodiment, a setup "quote part image print=ON" (1504) is further made.

Figure 16:
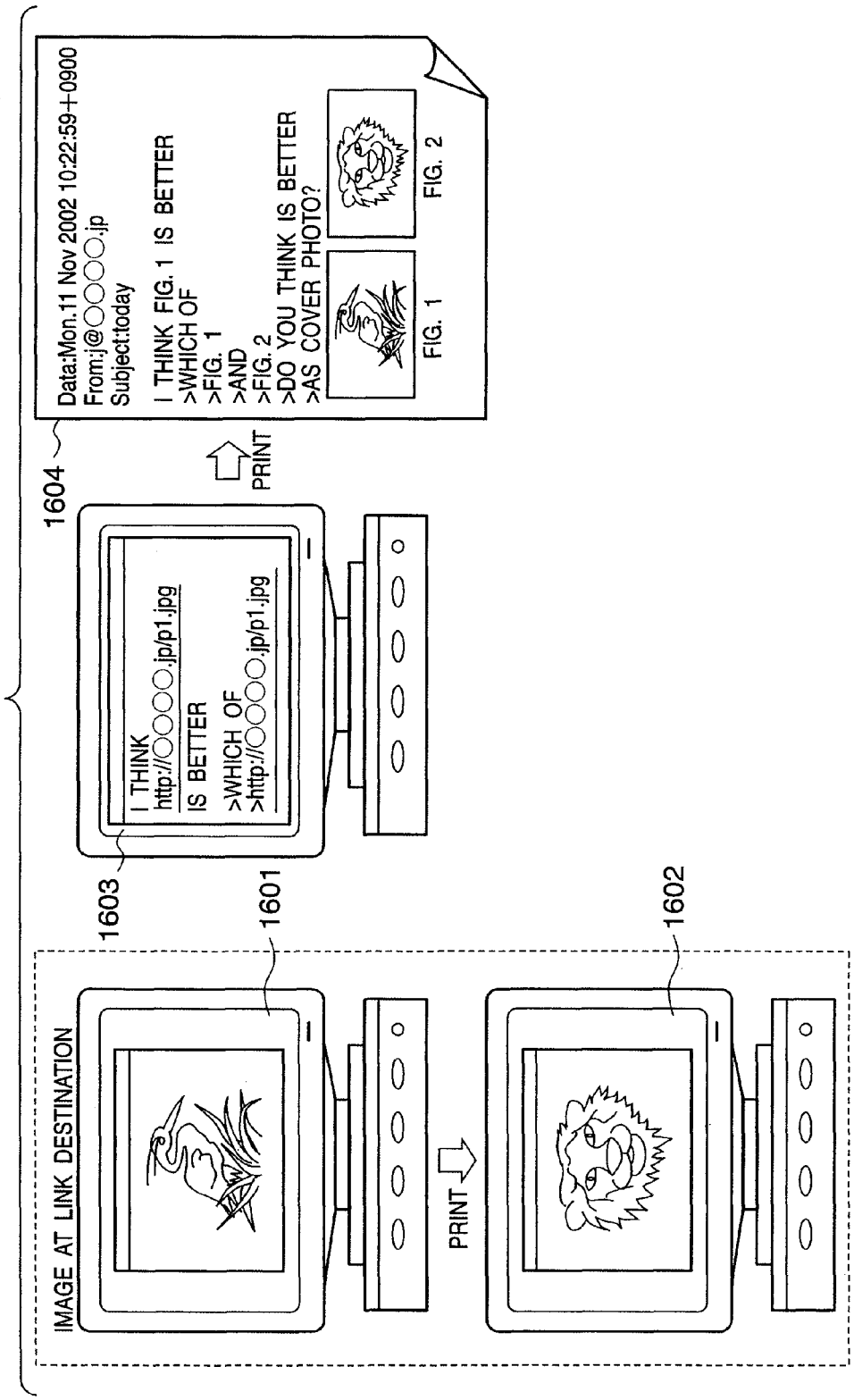
FIG. 16 is a view for explaining a print operation of the information processing apparatus when the setups shown in FIG. 15 are made.

FIG. 16 is a view for explaining a print operation of the information processing apparatus when the setups shown in FIG. 15 are made. When the setups shown in FIG. 15 are made, an image 1601 at a link destination in body text and images 1601 and 1602 at link destinations in a quote part are composited at the sentence end of a document (1604) upon printing a document 1603. In this case, captions (for example, "FIG. 1" and "FIG. 2") are added to the images 1601 and 1602, and the descriptions of link information in the document (including the quote part) are replaced by the captions of the corresponding images. Since the document 1603 includes two pieces of address information as a link to an identical image file (1601), a single caption (i.e., "FIG. 1") is added, and a common (one) image is to be actually composited (1604).

Figure 17:
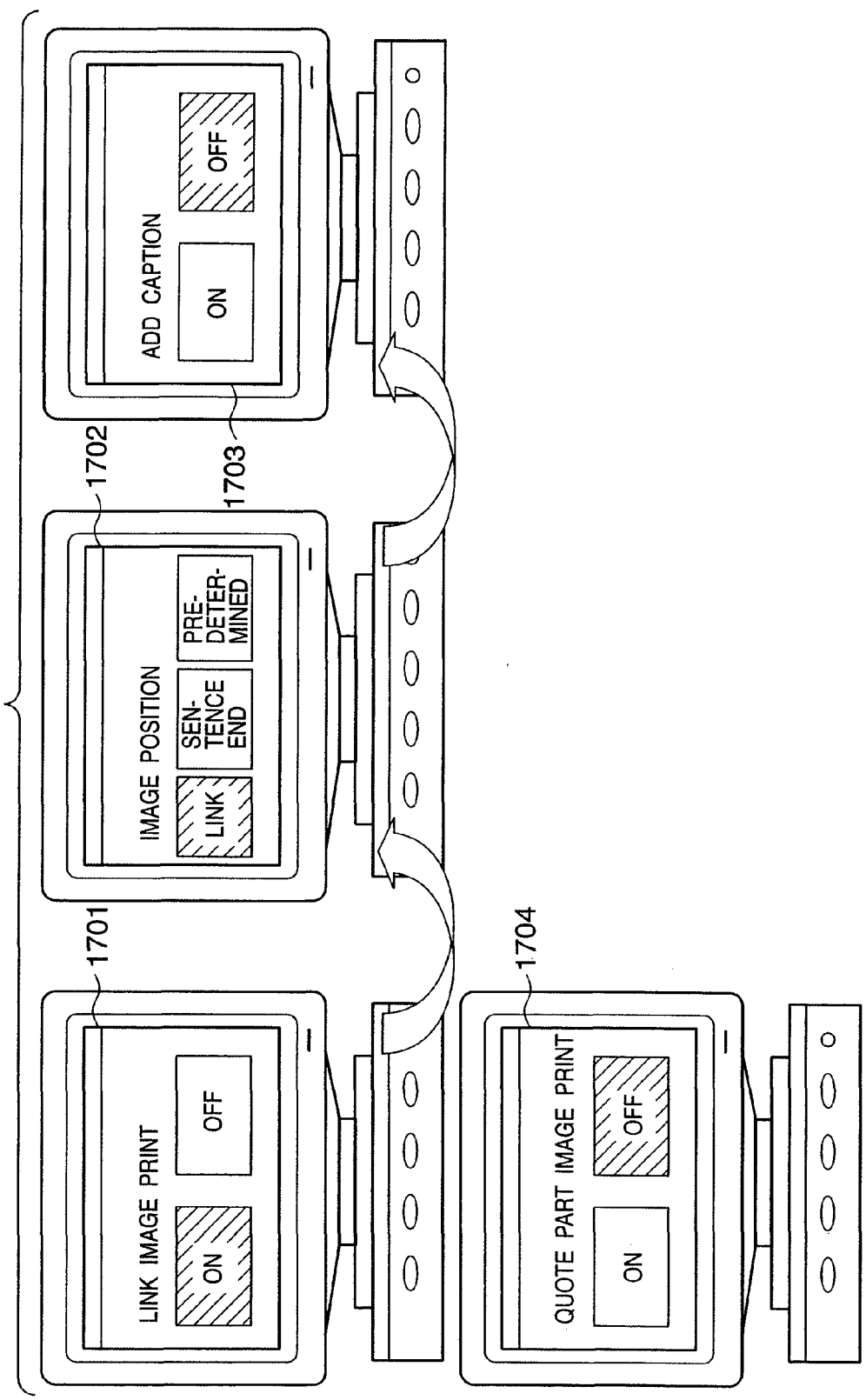
FIG. 17 is a view for explaining an example of an operation when no quote part image is printed by the information processing apparatus according to the third embodiment.

On the other hand, FIG. 17 is a view for explaining an example of an operation when no quote part image is printed by the information processing apparatus according to the third embodiment. A setup "link image print=ON" (1701 in FIG. 17) is made, a setup "image position=link (link description position)" (1702) is made, and a setup "add caption=OFF" (1703) is made. Then, a setup "quote part image print=OFF" (1704) is made.

Figure 18:
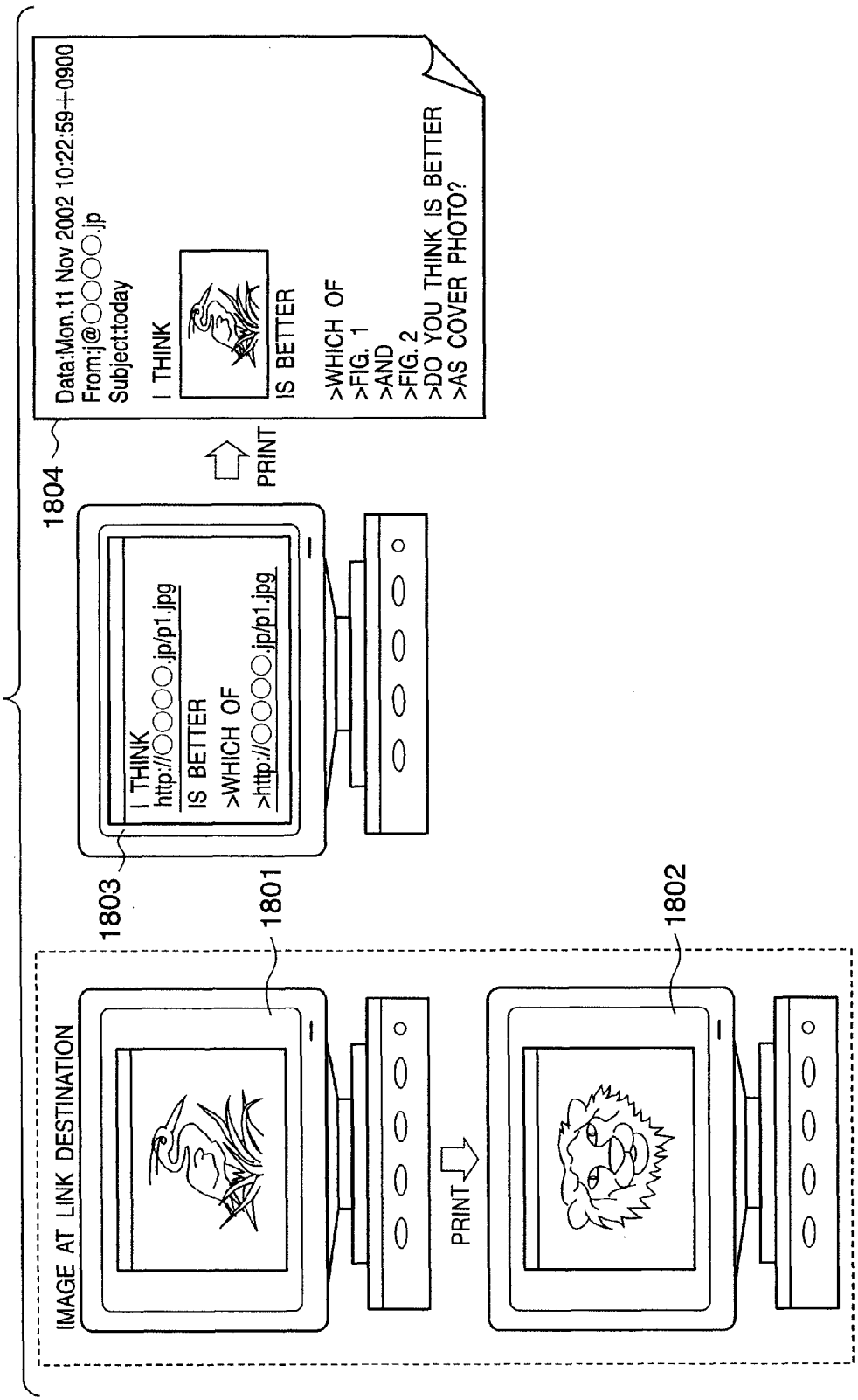
FIG. 18 is a view for explaining a print operation of the information processing apparatus when the setups shown in FIG. 17 are made.

FIG. 18 is a view for explaining a print operation of the information processing apparatus when the setups shown in FIG. 17 are made. When the setups shown in FIG. 17 are made, an image 1801 at a link destination in the body text is composited at the description position of the link information of the document upon printing a document 1803. At this time, images 1801 and 1802 at link destinations in the quote part are not printed (1804).

Figure 19:
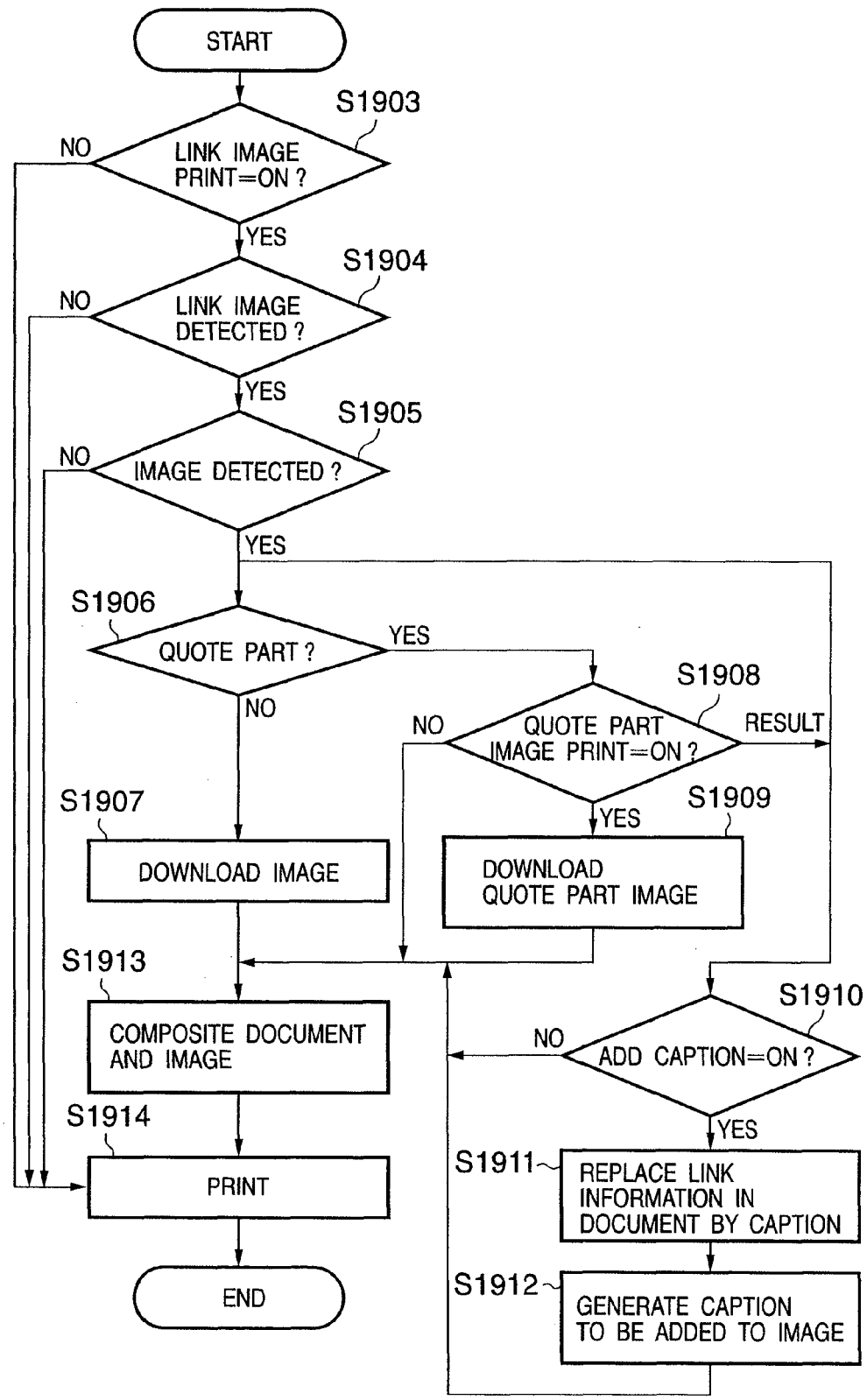
FIG. 19 is a flowchart for explaining an example of a print operation sequence by the information processing apparatus according to the third embodiment.

FIG. 19 is a flowchart for explaining an example of a print operation sequence by the information processing apparatus according to the third embodiment. Upon reception of a document print instruction, it is checked based on the setup shown in FIG. 10 or 12 if a print setup of an image at a link destination is ON for that document (step S1903). Whether or not the print setup of the image is ON is determined using the setup shown in FIG. 2 in the same manner as the first embodiment. As a result, if the print setup of an image at a link destination is OFF (NO in step S1903), a print process of the document alone is executed (step S1914).

On the other hand, if the print setup of an image at a link destination is ON (YES in step S1903), it is checked if the document data includes address information as a link to an image file (step S1904). Whether or not the document includes address information as a link to an image file is determined in the same manner as in the first and second embodiments. As a result, if no address information is included (NO in step S1904), a print process of the document alone is executed (step S1914).

On the other hand, if the address information is included (YES in step S1904), it is checked if an image is present at the link destination (step S1905). This checking process is also made in the same manner as in the first embodiment. As a result, if no image is found at the link destination, or if a description error has occurred or a dead link is found (NO in step S1905), a print process of the document alone is executed (step S1914). If document data includes a plurality of pieces of address information as links to a plurality of image files, and image files are actually present at some of these pieces of address information, the flow advances to step S1906 to check if the address information is included in a quote part. Note that whether or not the address information is included in a quote part is determined by checking if a symbol such as ">" or the like is included at the line head position.

As a result if the image (link) is not included in the quote part (NO in step S1906), an image at the link destination of the body text is downloaded (step S1907). On the other hand, if the image (link) is included in the quote part (YES in step S1906), it is checked if the print setup of the quote part image is ON (step S1908). Whether or not a link image in a quote part is to be printed is determined by loading the image print setups shown in, e.g., FIG. 2. As a result, if the print setup of the quote part image is OFF (NO in step S1908), the flow jumps to step S1913; otherwise (YES in step S1908), that image is downloaded (step S1909), and the flow then advances to step S1913.

If it is determined in step S1905 that the image is present (YES in step S1905), it is checked based on the setup in FIG. 2 if a caption is to be added (step S1910). Note that this checking process is attained by loading the setup as to whether or not a caption is added, as shown in FIG. 2. As a result, if the setup "add caption" is ON (YES in step S1910), the address information (character string) in the document is replaced by a caption (character string) (step S1911), and a caption (character string) to be added to the image is generated (step S1912). The flow then advances to step S1913. For example, if there are a plurality of pieces of address information as links to a plurality of images, and some pieces of information (character strings) are the same, these pieces of information are replaced by an identical caption (character string) to display a common image (i.e., one image). The downloaded image is composited with a document (step S1913), and a print process is executed (step S1914). Note that the composition position of the image is that set in FIGS. 2 and 3, and a composition process of a document and image uses an existing image processing technique.

As described above, according to the third embodiment, an image file can be printed together with a document upon printing a document that describes address information as a link to an image file. In this case, since "quote part link image print=ON/OFF" can be selected, user's convenience can be improved.

Fourth Embodiment

An information processing method for an information processing apparatus according to the fourth embodiment of the present invention will be described below. The first to third embodiments mentioned above have exemplified the document print process with the setup as to whether or not an image is to be printed when a document includes address information as a link to an image file. This embodiment will exemplify an application example of the above setup to a case wherein a linked image is, e.g., a frame image such as an ornamental frame or the like.

Figure 20:
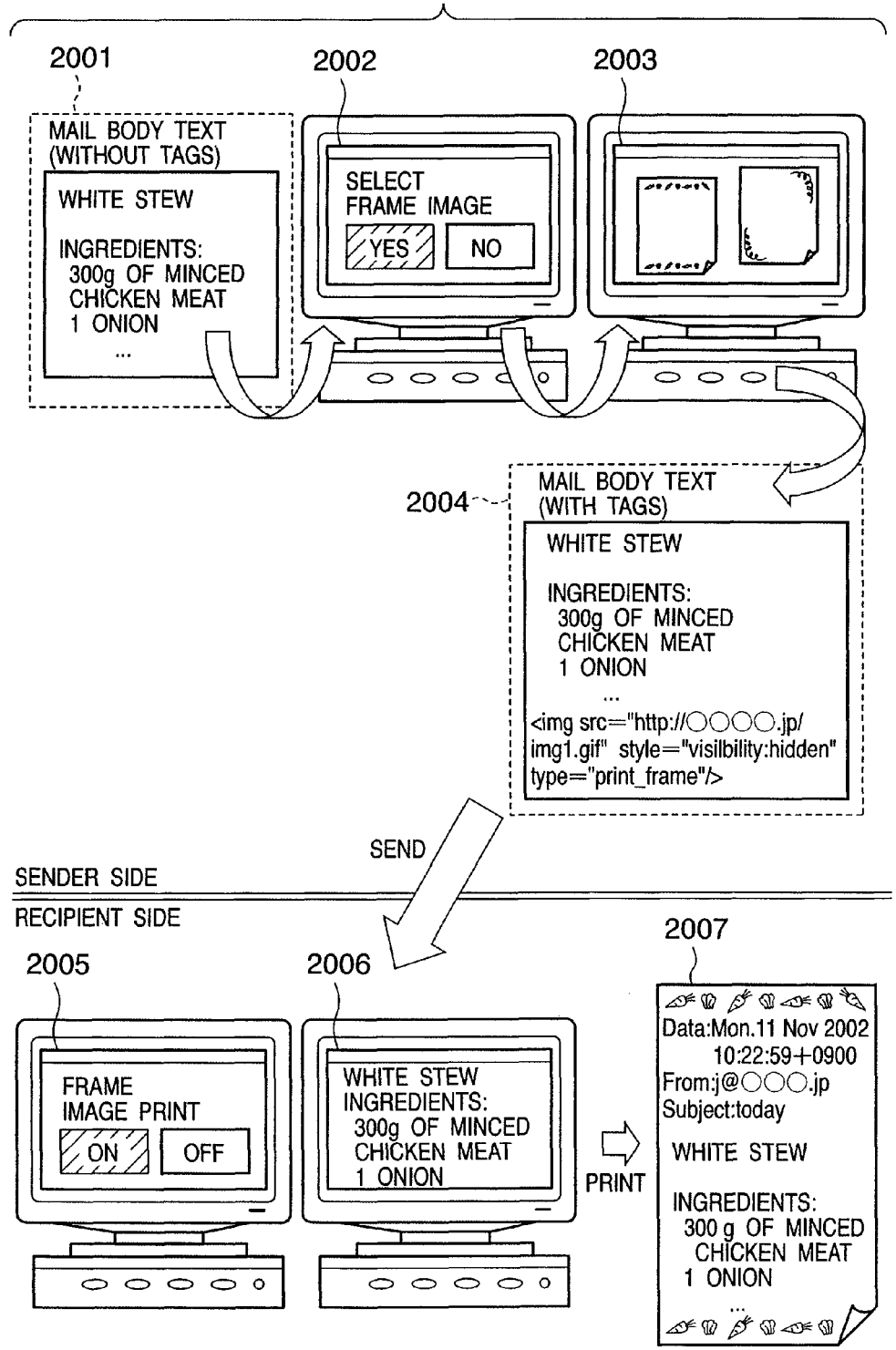
FIG. 20 is a view for explaining an example of an operation when a frame image is printed by an information processing apparatus according to the fourth embodiment.

FIG. 20 is a view for explaining an example of an operation upon printing a frame image by the information processing apparatus according to the fourth embodiment. As shown in FIG. 20, a mail sender makes a setup "frame image print=ON" (2002) for mail body text 2001, and then makes "frame image selection" (2003). As a result, tags are inserted into the mail body text (2004).

In the mail body text 2004, an "img" tag means to insert an image, "src="..."" indicates the location (URI) of the image file, and "style=visibility: hidden" means that the image is not displayed on the screen. The above tags are used in HTML or the like. In this embodiment, such tags are expanded, and "type="print_frame"" means that the image is a frame image. Note that the setup "frame image selection" may be made at a site that provides a frame image via the network. Also, the tags may be directly described in a document by the mail sender.

On the recipient side, upon reception of the mail body text 2004, the tags are parsed, and the body text is displayed on the screen (2006). As described above, since "style" designates not to display an image on the screen, no image appears on the screen (2006). If the setup "frame image print=ON" is made (2005), a frame image at a link destination can be composited to a document (2007) upon printing the document 2006.

Figure 21:
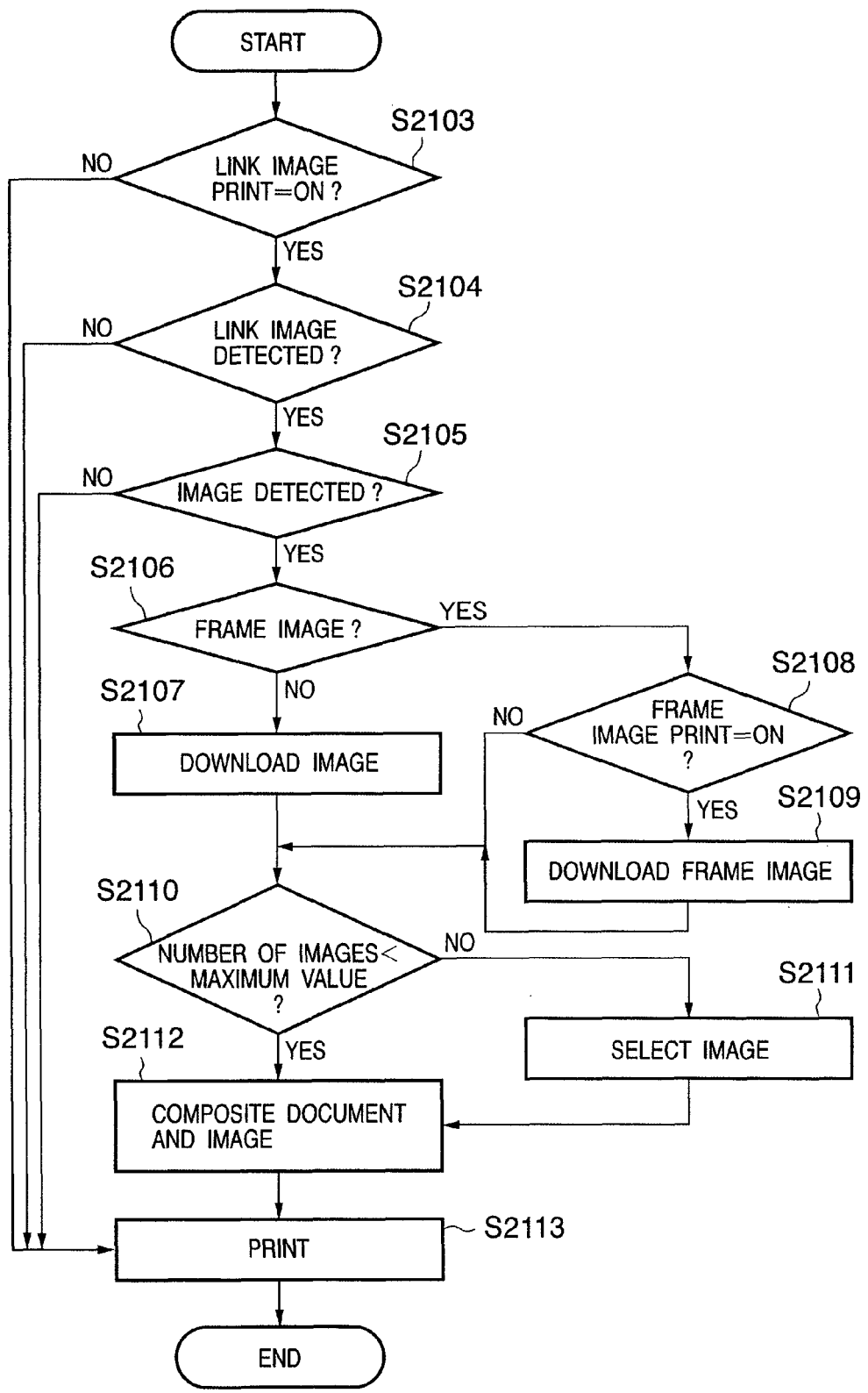
FIG. 21 is a flowchart for explaining an example of a print operation sequence by the information processing apparatus according to the fourth embodiment.

FIG. 21 is a flowchart for explaining an example of a print operation sequence by the information processing apparatus according to the fourth embodiment. Upon reception of a document print instruction, it is checked based on the setup shown in FIG. 2 if a print setup of an image at a link destination is ON (step S2103). As a result, if the print setup of an image at a link destination is OFF (NO in step S2103), a print process of the document alone is executed (step S2113). On the other hand, if the print setup of an image at a link destination is ON (YES in step S2103), it is checked if the document data includes address information as a link to an image file (step S2104). Whether or not the document includes address information is determined in the same manner as in the first to third embodiments.

As a result, if the document does not include any address information as a link to an image (NO in step S2104), a print process of the document alone is executed (step S2113). On the other hand, if the address information is included (YES in step S2104), it is checked by accessing the link destination if an image is present (step S2105). As a result, if no image is found at the link destination due to a description error or dead link (NO in step S2105), a print process of the document alone is executed (step S2113).

If the document includes a plurality of pieces of link information to a plurality of image files, and image files are actually present at some of these pieces of link information (YES in step S2105), only existing image files are to be downloaded, and the flow advances to step S2106 to check if the image to be downloaded is a frame image (step S2106). Note that whether or not the image is a frame image is determined by checking if the tag includes "type="print_frame"".

If the image is not a frame image (NO in step S2106), the image at the link destination is downloaded (step S2107), and the flow advances to step S2110; otherwise (YES in step S2106), it is checked based on FIG. 2 if the frame image print setup is ON (step S2108). As a result, if the frame image print setup is ON (YES in step S2108), that image is downloaded (step S2109), and the flow advances to step S2110.

It is checked in step S2110 if the total number of images is smaller than the maximum number of output images set in FIG. 2. If the total number of images is equal to or larger than the maximum number of output images (NO in step S2110), images to be composited are selected (step S2111), and the flow advances to step S2112. In the example of FIG. 20 above, since the maximum number of output images is not set, it assumes a default value (i.e., three images shown in FIG. 2). The images may be selected by the receiver, or may be selected up to the maximum value in the order they are read. Also, priority may be designated like "priority="1"", "priority="2"", "priority="3"", . . . by expanding the tags on the sender side, and images may be selected based on such priority. If it is determined in step S2110 that the total number of images is smaller than the maximum number of output images (YES in step S2110), or if images have been selected in step S2111, the downloaded images are composited with the document (step S2112), and a print process is executed (step S2113). Note that the composition position of the image is that set in FIGS. 2 and 3, and a composition process of a document and image uses an existing image processing technique.

As described above, according to the fourth embodiment, an image file can be printed together with a document upon printing a document having link information to an image file. Since a frame image such as an ornamental frame can be selected by the setup "frame image print=ON/OFF], the user's convenience can be improved.

Fifth Embodiment

An information processing method by an information processing apparatus according to the fifth embodiment of the present invention will be described below. The first to fourth embodiments described above have exemplified a case wherein an image at a link destination is a still image. However, this embodiment will explain a case wherein an image at a link destination is a moving image such as MPEG data, animation GIF data, or the like.

Figure 22:
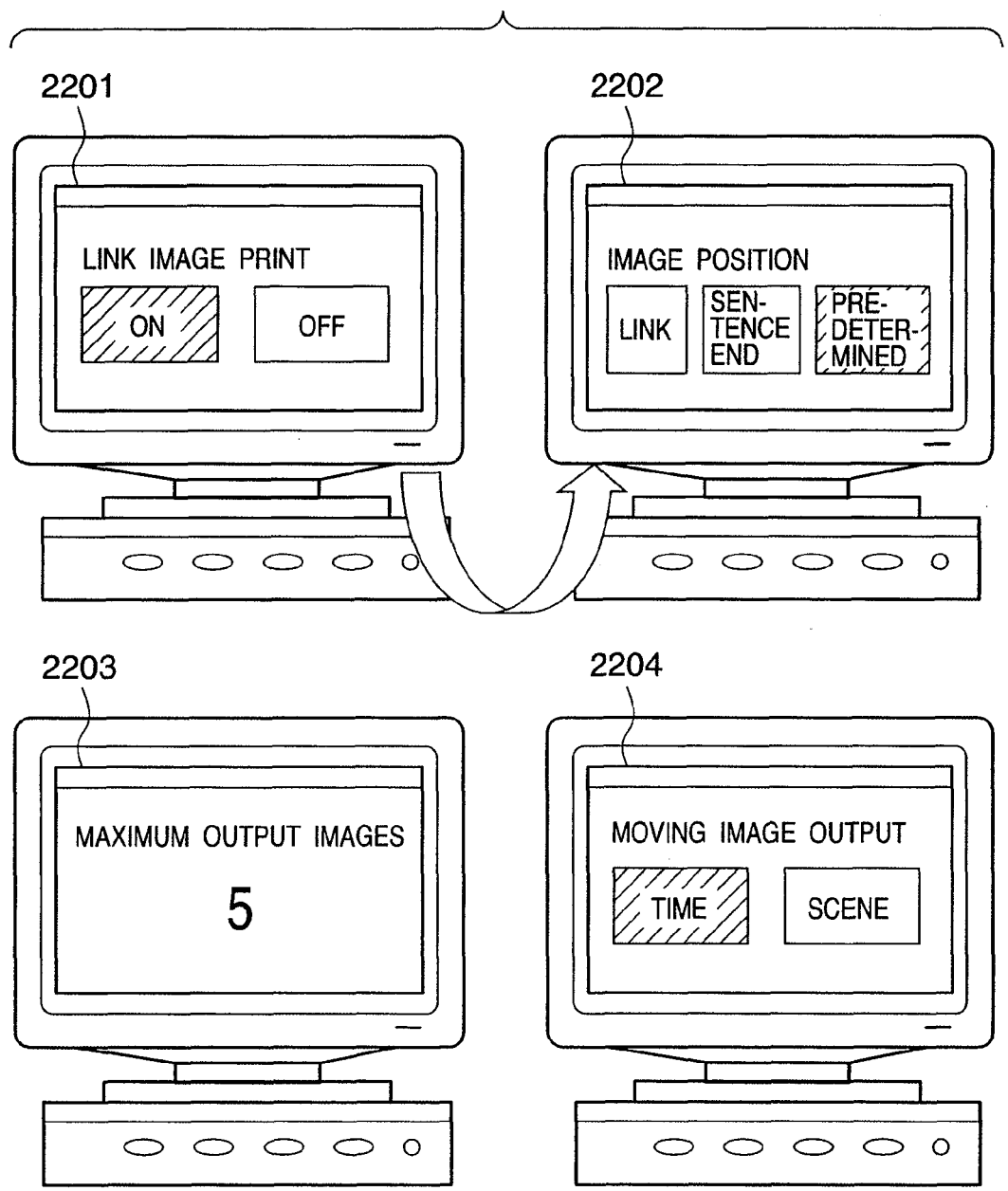
FIG. 22 is a view for explaining an example of an operation when a moving image output is set based on its time and is printed by an information processing apparatus according to the fifth embodiment.

FIG. 22 is a view for explaining an example of an operation when a moving image output is set based on its time and is printed by the information processing apparatus according to the fifth embodiment. A setup "link image print=ON" (2201) is made, a setup "image position=predetermined position" (2202), a setup "maximum output images: 5" (2203) is made, and a setup "moving image output=time" (2204) is made.

Figure 23:
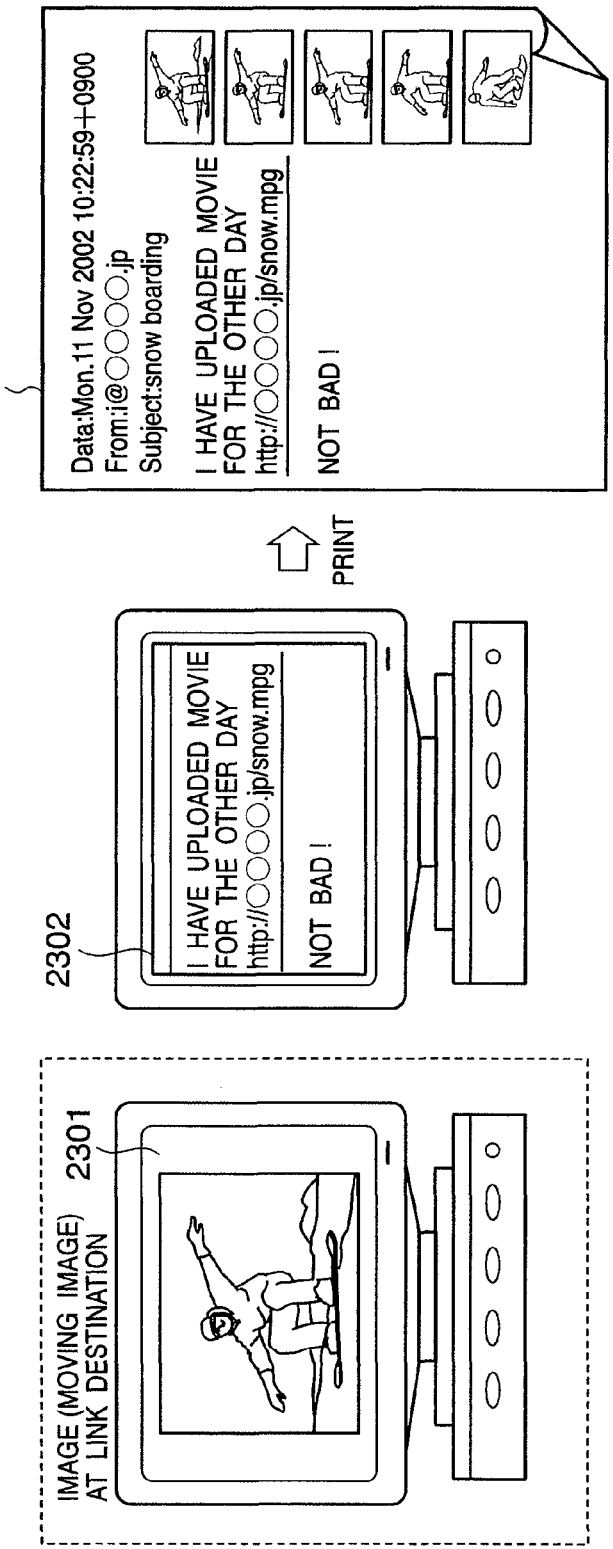
FIG. 23 is a view for explaining a print operation of the information processing apparatus when the setups shown in FIG. 22 are made.

FIG. 23 is a view for explaining a print operation of the information processing apparatus when the setups shown in FIG. 22 are made. When the setups shown in FIG. 22 are made, images are selected up to five images (maximum number of output images) from a moving image 2301 at a link destination, which is based on an address described in body text, on the basis of the time, upon printing a document 2302. Then, the selected images are composited at the predetermined positions (2303) based on the setup of FIG. 2, and these images and document are printed.

Note that scene selection based on the time (corresponding to the process in step S2111 in the fourth embodiment) adopts an existing technique (e.g., a moving image playback time is divided into five, and the first one of each of five divided frame groups is selected). Note that the predetermined position may be set by the apparatus (application) or the user himself or herself by inputting a coordinate position or designating an area.

Figure 24:
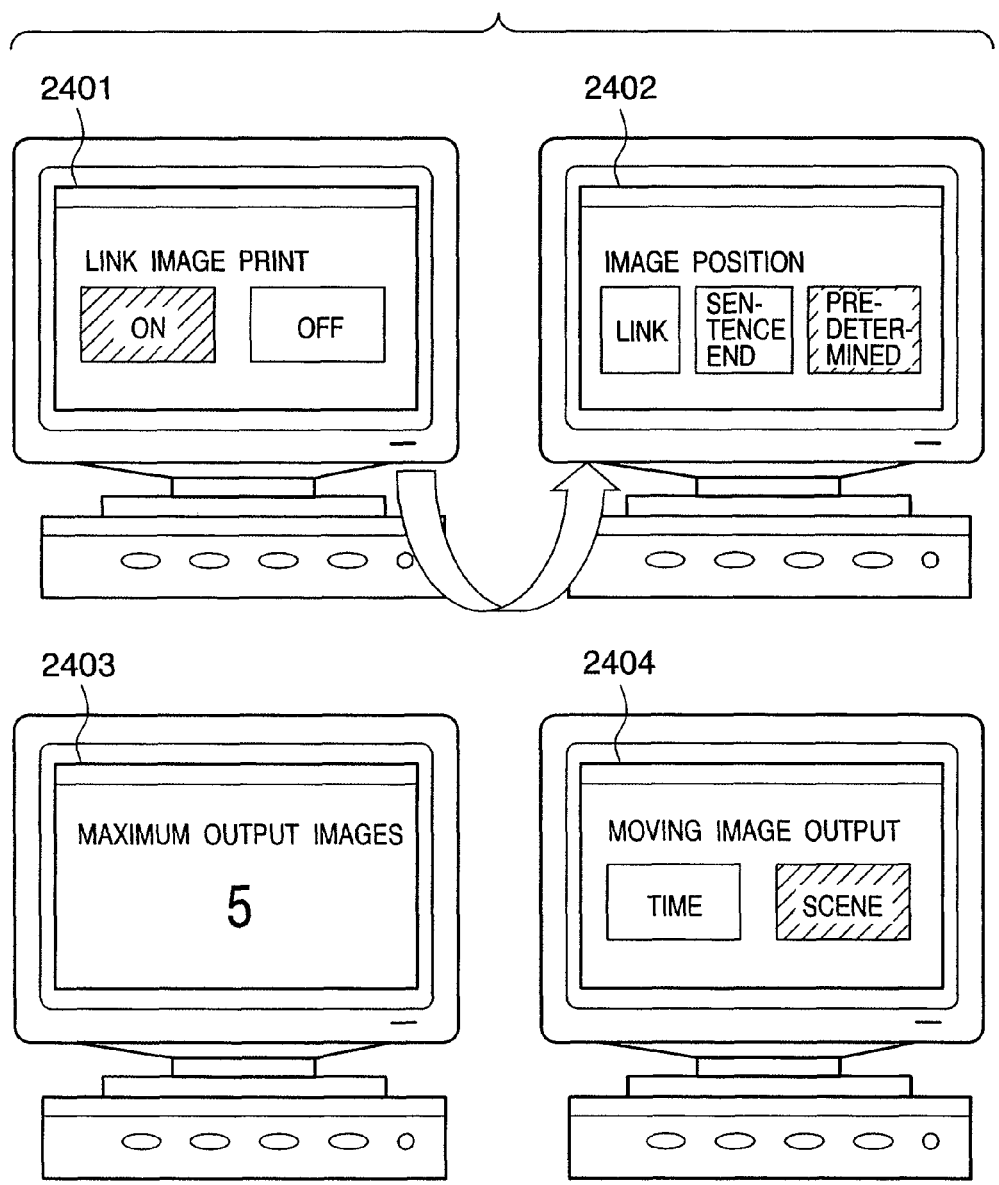
FIG. 24 is a view for explaining an example of an operation when a moving image output is set based on scene change information and is printed by the information processing apparatus according to the fifth embodiment.

FIG. 24 is a view for explaining an example of an operation when a moving image output is set based on scene change information and is printed by the information processing apparatus according to the fifth embodiment. A setup "link image print=ON" (2401) is made, a setup "image position=predetermined position" (2402), a setup "maximum output images: 5" (2403) is made, and a setup "moving image output=scene" (2404) is made. That is, images are selected based on scene change information, and are composited at the predetermined position set in FIG. 2 upon printing.

Figure 25:
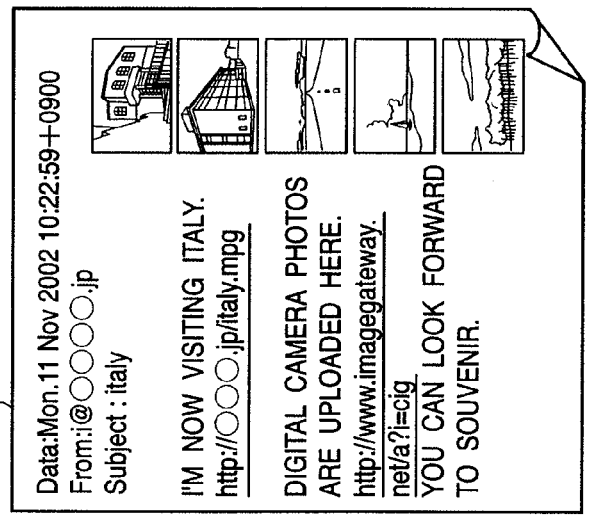
FIG. 25 is a view for explaining a print operation of the information processing apparatus when the setups shown in FIG. 24 are made.

FIG. 25 is a view for explaining a print operation of the information processing apparatus when the setups shown in FIG. 24 are made. When the setups shown in FIG. 24 are made, images are selected up to five images (maximum number of output images) from a moving image 2501 at a link destination, which is based on an address described in body text, on the basis of the scene change information, upon printing a document 2502. Then, the selected images are composited at the predetermined positions (2503) based on the setup of FIG. 2, and these images and document are printed.

Note that image selection based on the scene change information (corresponding to step S2111 in the flowchart shown in FIG. 21) adopts an existing technique (e.g., frame images with larger change ratios are selected). Note that the predetermined position may be set by the apparatus (application) or the user himself or herself by inputting a coordinate position or designating an area.

As described above, according to the fifth embodiment, an image file can be printed together with a document upon printing a document having link information to an image file. Since images can be selected from a moving image and can be printed, user's convenience can be improved.

Other Embodiments

In the first to fifth embodiments, the process for downloading image data or the like which is linked based on address information from a WWW server or the like on the Internet, and compositing and printing the image data in the document data has been explained. Also, an image which is saved in another computer connected to a network such as a LAN or the like may be downloaded by designating its address information, and can be composited and printed in document data. Not only an image uploaded to a WWW server or the like on the Internet but also page information of a home page may be designated and downloaded by address information, and may be composited and printed in document data.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, an image at a link destination can be composited and printed in document data upon printing document data that describes address information as a link to an image file. Hence, the need for additional access by the user can be obviated, and output data that can improve user's convenience can be obtained.

The present invention is not limited to the above embodiments and various changes and modifications can be made within the spirit and scope of the present inventions, the following claims are made.

CLAIM OF PRIORITY

This application claims priority from Japanese Patent Application No. 2003-203284 filed on Jul. 29, 2003, which is hereby incorporated by reference herein.

What is claimed is:

1. An information processing method implemented in an information processing apparatus, for printing document data which includes a plurality of address expressions, wherein each address expression respectively designates an address on a network of corresponding image data which can be accessed via the network, comprising:
   a detection step of detecting each address expression described in the document data when a print instruction of the document data is issued;
   a setting step of setting a caption expression for each of the image data corresponding to each of the detected address expressions, wherein each respective caption expression is different from the corresponding detected address expression;
   a replacing step of replacing each detected address expression in the document data with the respective caption expression set in the setting step;
   an acquisition step of acquiring each of the image data via the network using the respective detected address expression;
   an embedding step of embedding each respective caption expression in the corresponding image data;
   a print data generation step of generating print data by embedding the image data having the embedded caption expression at a predetermined position in the document data having the caption expression replaced in the replacing step; and
   a print step of printing the print data and outputting the printed data as a visualized document,
   wherein the visualized document visibly comprises both the caption expression replaced in the replacing step and the caption expression embedded in the image data in the embedding step.

2. The method according to claim 1, wherein the document data is described in a markup description language.

3. The method according to claim 1, further comprising:
   an OCR step of applying character recognition to a scanned image obtained by optically scanning handwritten or printed characters,
   wherein the document data is acquired as a result of the character recognition in the OCR step.

4. The method according to claim 1, wherein the predetermined position in the document data is a position of the corresponding address expression replaced in the replacing step.

5. The method according to claim 1, wherein the predetermined position in the document data is an end of a sentence of the document data.

6. The method according to claim 1, wherein when a plurality of same address expressions are detected in the document data in the detection step,
   the replacing step includes a step of replacing each of the plurality of same address expressions with a same caption expression, and the print data generation step includes a step of embedding only one piece of image data having the embedded caption expression corresponding to the same caption expression in the document data.

7. The method according to claim 1, wherein the print step includes a step of printing the image data having the embedded caption expression on a single print medium together with the document data having the replaced caption expression.

8. The method according to claim 1, wherein the image data is uploaded to a predetermined server connected to the Internet.

9. The method according to claim 8, wherein the print data generation step includes steps of:
designating the allowable number of image data having the embedded caption expression that can be embedded in the document data having the replaced caption expression, and
embedding the image data having the embedded caption expression in the document data having the replaced caption expression within a range of the allowable number.

10. The method according to claim 9, wherein the print data generation step includes a step of embedding, when the image data is a moving image data, one or a plurality of image data having the embedded caption expression corresponding to frame images in the moving image data in the document data having the replaced caption expression within the range of the allowable number.

11. The method according to claim 1, wherein the print instruction includes designating a position and size upon embedding the image data having the embedded caption expression in the document data having the replaced caption expression.

12. An information processing apparatus for printing document data which includes a plurality of address expressions, wherein each address expression respectively designates an address on a network of corresponding image data which can be accessed via the network, comprising:
detection means for detecting each address expression described in the document data when a print instruction of the document data is issued;
setting means for setting a caption expression for each of the image data corresponding to each of the detected address expressions, wherein each respective caption expression is different from the corresponding detected address expression;
replacing means for replacing each detected address expression in the document data with the respective caption expression set by the setting means;
acquisition means for acquiring each of the image data via the network using the respective detected address expression;
embedding means for embedding each respective caption expression in the corresponding image data;
print data generation means for generating print data by embedding the image data having the embedded caption expression at a predetermined position in the document data having the caption expression replaced by the replacing means; and
print means for printing the print data and outputting the printed data as a visualized document,
wherein the visualized document visibly comprises both the caption expression replaced by the replacing means and the caption expression embedded in the image data by the embedding means.

13. A non-transitory computer-readable storage medium on which is stored a computer program for making a computer print document data which includes a plurality of address expressions, wherein each address expression respectively designates an address on a network of corresponding image data which can be accessed via the network, comprising:
a detection step of detecting each address expression described in the document data when a print instruction of the document data is issued;
a setting step of setting a caption expression for each of the image data corresponding to each of the detected address expressions, wherein each respective caption expression is different from the corresponding detected address expression;
a replacing step of replacing each detected address expression in the document data with the respective caption expression set in the setting step;
an acquisition step of acquiring each of the image data via the network using the respective detected address expression;
an embedding step of embedding each respective caption expression in the corresponding image data;
a print data generation step of generating print data by embedding the image data having the embedded caption expression at a predetermined position in the document data having the replaced caption expression; and
a print step of printing the print data and outputting the printed print data as a visualized document,
wherein the visualized document visibly comprises both the caption expression replaced in the replacing step and the caption expression embedded in the image data by the embedding step.

* * * * *